United States Patent
Maekawa et al.

(10) Patent No.: US 10,006,105 B2
(45) Date of Patent: Jun. 26, 2018

(54) SOLID SILVER-COPPER ALLOY HAVING MAINLY A NON-EUTECTIC STRUCTURE NOT CONTAINING A EUTECTIC AT ROOM TEMPERATURE

(75) Inventors: Masaki Maekawa, Izumi (JP); Daisuke Honda, Izumi (JP); Masakazu Enomura, Izumi (JP)

(73) Assignee: M. TECHNIQUE CO., LTD., Izumi-Shi (JP)

(*) Notice: Subject to any disclaimer, the term of this patent is extended or adjusted under 35 U.S.C. 154(b) by 288 days.

(21) Appl. No.: 14/355,855

(22) PCT Filed: Aug. 16, 2012

(86) PCT No.: PCT/JP2012/070853
§ 371 (c)(1),
(2), (4) Date: May 2, 2014

(87) PCT Pub. No.: WO2013/073241
PCT Pub. Date: May 23, 2013

(65) Prior Publication Data
US 2014/0301892 A1    Oct. 9, 2014

(30) Foreign Application Priority Data

Nov. 16, 2011 (JP) .................................. 2011-251047
Dec. 28, 2011 (WO) .................. PCT/JP2011/080524

(51) Int. Cl.
*C22C 9/00* (2006.01)
*B22F 9/24* (2006.01)
(Continued)

(52) U.S. Cl.
CPC .............. *C22C 9/00* (2013.01); *B22F 1/0018* (2013.01); *B22F 9/24* (2013.01); *B82Y 30/00* (2013.01)

(58) Field of Classification Search
CPC .. C22C 9/00; C22C 5/06; C22C 30/02; C22C 1/0425; C22C 1/06; C22C 30/04; C22C 38/008; C22F 1/08; H01B 1/026
See application file for complete search history.

(56) References Cited

U.S. PATENT DOCUMENTS 6,228,457 B1  5/2001  Ueno et al.
8,163,110 B2  4/2012  Aoyagi et al.
(Continued)

FOREIGN PATENT DOCUMENTS

CN    1702180 A     11/2005
EP    2 422 904 A1   2/2012
(Continued)

OTHER PUBLICATIONS

Subramanian, P.R. et al., "The Ag—Cu (Silver-Copper) System," Feb. 1993, vol. 14, pp. 62-75.*
(Continued)

*Primary Examiner* — Colleen P Dunn
*Assistant Examiner* — Nicholas A Wang
(74) *Attorney, Agent, or Firm* — Birch, Stewart, Kolasch & Birch, LLP

(57) ABSTRACT

The present invention addresses the problem of providing a novel, solid silver-copper alloy. Provided is a solid silver-copper alloy in which the concentration of copper contained in the silver-copper alloy is 0.1-99.94 wt %, and which has, as the principal constituent thereof, a non-eutectic structure which does not contain a eutectic when the solid silver-copper alloy is at room temperature. This silver-copper alloy can be produced by mixing a fluid containing silver ions and copper ions with a fluid containing a reducing agent, and separating silver-copper alloy particles therefrom. It is preferable to mix the fluid containing the silver ions and copper ions with the fluid containing the reducing agent in a (Continued)

thin-film fluid formed between processing surfaces arranged so as to face one another, capable of approaching toward and separating from one another, and capable of having at least one surface rotate relative to the other. The diameter of the particles of the silver-copper alloy is preferably 50 nm or less. This solid silver-metal alloy may also be a solid alloy comprising one or more types of other metals in addition to silver and copper.

25 Claims, 26 Drawing Sheets

(51) Int. Cl.
  *B22F 1/00* (2006.01)
  *B82Y 30/00* (2011.01)

(56) References Cited

U.S. PATENT DOCUMENTS

| | | | |
|---|---|---|---|
| 8,287,617 B2 | 10/2012 | Nakatani | |
| 2002/0066503 A1 | 6/2002 | Matsui et al. | |
| 2004/0055418 A1* | 3/2004 | Akimoto | B22F 1/0044 75/351 |
| 2004/0187977 A1 | 9/2004 | Matsui et al. | |
| 2005/0260438 A1 | 11/2005 | Aoyagi et al. | |
| 2006/0032330 A1 | 2/2006 | Sato | |
| 2006/0231169 A1 | 10/2006 | Park et al. | |
| 2008/0202648 A1 | 8/2008 | Aoyagi et al. | |
| 2009/0181183 A1* | 7/2009 | Li | B82Y 30/00 427/553 |
| 2010/0155310 A1* | 6/2010 | Enomura | B01F 3/0807 209/668 |
| 2010/0221559 A1* | 9/2010 | Konno | B22F 1/0059 428/457 |
| 2010/0243947 A1 | 9/2010 | Enomura | |
| 2010/0280296 A1* | 11/2010 | Bisson | B01J 23/40 585/277 |
| 2010/0327236 A1 | 12/2010 | Enomura | |

FOREIGN PATENT DOCUMENTS

| | | |
|---|---|---|
| JP | H09-125176 A | 5/1997 |
| JP | 2000-144203 A | 5/2000 |
| JP | 2000-285517 A | 10/2000 |
| JP | 2002-121629 A | 4/2002 |
| JP | 2002-226926 A | 8/2002 |
| JP | 2006-063347 A | 3/2006 |
| JP | 2006-183110 A | 7/2006 |
| JP | 2007-132654 A | 5/2007 |
| JP | 2007-291443 A | 11/2007 |
| JP | 2008-049336 A | 3/2008 |
| JP | 2008-57044 A | 3/2008 |
| JP | 2008057044 * | 3/2008 |
| JP | 2009-132994 A | 6/2009 |
| JP | 2009-144250 A | 7/2009 |
| JP | 2011-68936 A | 4/2011 |
| WO | WO 2009/008390 A1 | 1/2009 |
| WO | WO 2010/122811 A1 | 10/2010 |

OTHER PUBLICATIONS

Singh, M. et al. "Synthesis of nanostructured Ag—Cu alloy ultrafine particles." 2009. 63. p. 2243-2245.*
Ag (Silver) Binary Alloy Phase Diagrams, Alloy Phase Diagrams. vol. 3, ASM Handbook, ASM International, 2016, p. 90-113.*
Haverkamp et al., "Pick Your Carats: Nanoparticles of Gold-Silver-Copper Alloy Produced in Vivo," Journal of Nanoparticle Research, vol. 9, No. 4, Jan. 11, 2007, XP19506680A, pp. 697-700.
Jakobi et al., "Stoichiometry of Alloy Nanoparticles from Laser Ablation of PtIr in Acetone and Their Electrophoretic Deposition on PtIr Electrodes," Nanotechnology, IOP, Bristol, GB, vol. 22, No. 14, Feb. 24, 2011, XP20188826A, pp. 1-7.
Tran et al., "TEM Characterization of Chemically Synthesized Copper-Gold Nanoparticles," Journal of Nanoparticle Research, vol. 13, No. 9, Apr. 8, 2011, XP19937337A, pp. 4229-4237.

* cited by examiner

SOLID SILVER-COPPER ALLOY HAVING MAINLY A NON-EUTECTIC STRUCTURE NOT CONTAINING A EUTECTIC AT ROOM TEMPERATURE

TECHNICAL FIELD

The present invention relates to a silver-copper alloy and a solid alloy comprising at least three metals including silver, copper, and a metal other than silver and copper.

BACKGROUND ART

In recent years, an alloy particle comprising silver and copper is drawing an attention as a material used in an electrically conductive paste, an electrically conductive ink, an electrically conductive fine wiring, and the like; or as a material for a reducing catalyst of carbon monoxide and nitrogen oxides (NOx) as well as for a lead-free soldering. There is a possibility of controlling characteristics thereof by the ratio of silver to copper in a silver-copper alloy particle; and for example, a silver-copper alloy particle mainly made of silver, comprising silver which has superior specific resistance and oxidation resistance and copper which can suppress migration of silver, and a silver-copper alloy particle mainly made of copper useful as the material for wiring such as a magnet wire are drawing attention, too. Furthermore, antimicrobial properties of each of silver and copper are drawing attention, and in addition, many applications thereof including use in jewelry are expected; and thus, the silver-copper alloy is a widely wanted material in the industrial world. Migration occurs in many metals, and it is known that silver migrates faster; and it is said that migration thereof can be made slower by alloying it with other metals such as copper. However, the alloy of silver with copper is generally eutectic, so that in many cases the characteristics expected as the silver-copper alloy are not fully realized in suppressing the oxidation susceptibility of copper, suppressing migration of silver, and the like.

As to the producing methods of the silver-copper alloy particle, there are such methods as a liquid-phase reduction method, an atomizing method, and so forth, as described in Patent Document 1, Patent Document 2, and Patent Document 3. However, the silver-copper alloy obtained by any of these methods is a core-shell type or contains a eutectic; and therefore, there has been no disclosure as to the silver-copper alloy substantially not containing a eutectic and the producing method thereof. In Patent Document 1, the silver-core and the silver-copper-shell nanoparticle is mentioned, wherein the silver-copper alloy to constitute the shell is described from the elemental analysis in combination of the electron microscopic observation and the energy dispersive X-ray fluorescence measurement. However, because mapping of each of silver and copper in the shell part is not disclosed, and also for other reasons, there still remains the question as to whether or not silver and copper form the solid solution. In Patent Document 4, it is described that silver-covered copper powder obtained by covering the copper particle surface with silver was heat-treated at 150 to 600° C. under the non-oxidative atmosphere thereby dispersing silver to the copper particle to obtain the silver-dispersed copper powder. However, because the silver-dispersed copper powder is produced by dispersing silver metal from the copper particle surface, it is difficult to disperse silver to the central part of the copper particle; and thus, not only it is difficult to have the state not containing the eutectic in the entire particle thereof, but also the particle diameter thereof is too large to be used as a paste. Moreover, with regard to the analysis method of the silver-dispersed metal powder, there is a possibility that the copper single body might be present in the central part of the particle as it might also be the case that by heat treatment the metal silver that was present as the single body thereof on surface of the copper particle could not be confirmed merely by the surface observation (scanning electron microscope (SEM) observation). From these considerations, microscopically the above-mentioned silver-copper alloy cannot be regarded as the alloy, though macroscopically it may be regarded as the alloy.

In addition, there is a method such as for example in which a partial solid solution of the silver-copper alloy particle is obtained by rapidly cooling from the state that the metal silver and the metal copper are co-melted at high temperature; however, there has been no disclosure as to the silver-copper alloy having mainly the non-eutectic structure such as the solid solution. On top of this, the production thereof requires high energy so that this method automatically leads to problems such as high production cost.

In Patent Document 5, which is filed by the present applicant, the producing method of the silver-copper alloy particle is disclosed; however, analysis of the particle obtained by the producing method thereof shown by Example reveals that this particle is the silver-copper alloy particle formed of the eutectic or mixture of single bodies of silver and copper. Accordingly, there has been no disclosure as to the silver-copper alloy substantially not containing the eutectic body, especially as to the solid solution type silver-copper alloy.

As to the tin-silver-copper alloy, only the eutectic alloy thereof has been disclosed, as shown in Patent Document 6; and thus, there has been no disclosure as to the metal alloy mainly having the non-eutectic structure substantially not containing the eutectic.

PRIOR ART DOCUMENTS

Patent Document

Patent Document 1: Japanese Patent Laid-Open Publication No. 2011-068936
Patent Document 2: Japanese Patent Laid-Open Publication No. 2006-183110
Patent Document 3: Japanese Patent Laid-Open Publication No. 2000-144203
Patent Document 4: Japanese Patent Laid-Open Publication No. 2008-057044
Patent Document 5: International Patent Laid-Open Publication No. 2009/008390
Patent Document 6: Japanese Patent Laid-Open Publication No. 2007-132654

DISCLOSURE OF THE INVENTION

Problems to be Solved by the Invention

In view of the situation mentioned above, the present invention has an object to provide a silver-copper alloy substantially not containing a eutectic. Another object of the present invention is to provide a metal alloy which is a solid alloy comprising at least three metals including silver, copper, and a metal other than silver and copper, substantially not containing a eutectic.

Means for Solving the Problems

The present invention solves the problems mentioned above by providing a solid silver-copper alloy substantially not containing a eutectic.

That is, the present invention solves the problems mentioned above by providing a silver-copper alloy wherein the silver-copper alloy is a solid silver-copper alloy having 0.1 to 99.94% by weight of copper concentration contained in the silver-copper alloy, and the said solid silver-copper alloy has mainly a non-eutectic structure not containing a eutectic at room temperature.

A silver-copper alloy that may be executed in the present invention is a solid silver-copper alloy having 0.1 to 99.94% by weight of copper concentration contained in the silver-copper alloy, and as a result of analysis of mole ratios therein of silver to copper in a minute area by the beam diameter of 5 nm using energy dispersive X-ray spectroscopy under observation with the transmission electron microscope (TEM-EDS) analysis, in 50% or more of analysis points, the mole ratios of silver to copper in the said solid silver-copper alloy are detected within ±30% of the mole ratios of silver to copper obtained by inductively coupled plasma atomic emission spectrophotometry (ICP) analysis results of the said solid silver-copper alloy.

In addition, a silver-copper alloy that may be executed in the present invention is a solid silver-copper alloy having 0.1 to 99.94% by weight of copper concentration contained in the silver-copper alloy, and as a result of analysis of mole ratios of silver to copper in a minute area by the beam diameter of 0.2 nm using energy dispersive X-ray spectroscopy under observation with the scanning transmission electron microscope (STEM-EDS) analysis, in 50% or more of analysis points, the mole ratios of silver to copper in the said solid silver-copper alloy are detected within ±30% of the mole ratios of silver to copper obtained by ICP analysis results of the said solid silver-copper alloy.

In addition, the silver-copper alloy that may be executed in the present invention is obtained by mixing a silver ion, a copper ion, and a reducing agent in a thin film fluid formed between at least two processing surfaces which are disposed in a position they are faced with each other so as to be able to approach to and separate from each other, at least one of which rotates relative to the other, whereby separating a silver-copper alloy particle.

In addition, the silver-copper alloy that may be executed in the present invention is a solid solution.

In addition, in the silver-copper alloy that may be executed in the present invention, both silver and copper are detected at all of the analysis points as a result of analysis within a minute area with the beam diameter of 5 nm by using TEM-EDS analysis.

In addition, in the silver-copper alloy that may be executed in the present invention, both silver and copper are detected at all of the analysis points as a result of analysis within a minute area with the beam diameter of 0.2 nm by using STEM-EDS analysis.

In addition, the silver-copper alloy that may be executed in the present invention is silver-copper alloy particle having 0.1 to 99.94% by weight as the concentration of copper contained in the silver-copper alloy.

In addition, the silver-copper alloy that may be executed in the present invention comprises particles whose particle diameters are 50 nm or less.

In addition, the silver-copper alloy that may be executed in the present invention does not have crystal grain boundary.

In addition, the silver-copper alloy that may be executed in the present invention is silver-copper alloy particle not treated by heat under dry condition.

In addition, the silver-copper alloy that may be executed in the present invention is produced by mixing a fluid which contains a silver ion and a copper ion with a fluid which contains a reducing agent to separate silver-copper alloy particle.

In addition, the reducing agent that may be executed in the present invention comprises at least two reducing agents, wherein the said at least two reducing agents are at least two reducing agents selected from hydrazines and amines.

In addition, the at least two reducing agents that may be executed in the present invention are hydrazine monohydrate and dimethylamino ethanol.

In addition, the silver-copper alloy that may be executed in the present invention contains tin in addition to silver and copper.

Advantages

In the present invention, provided is a silver-copper alloy substantially not containing a eutectic body, especially a solid solution silver-copper alloy, so that expression of characteristics to suppress the oxidation susceptibility of copper, to suppress migration of silver, and the like may be expected.

In addition, in the present invention, provided also is a metal alloy which is a solid alloy comprising at least three metals including silver, copper, and a tin which is a metal other than silver and copper, substantially not containing a eutectic, so that expression of characteristics to suppress the oxidation susceptibility of copper, to suppress migration of silver, and the like may be expected.

BEST MODES FOR CARRYING OUT THE INVENTION

Hereunder, one embodiment of the present invention will be specifically explained.

Figure 7:
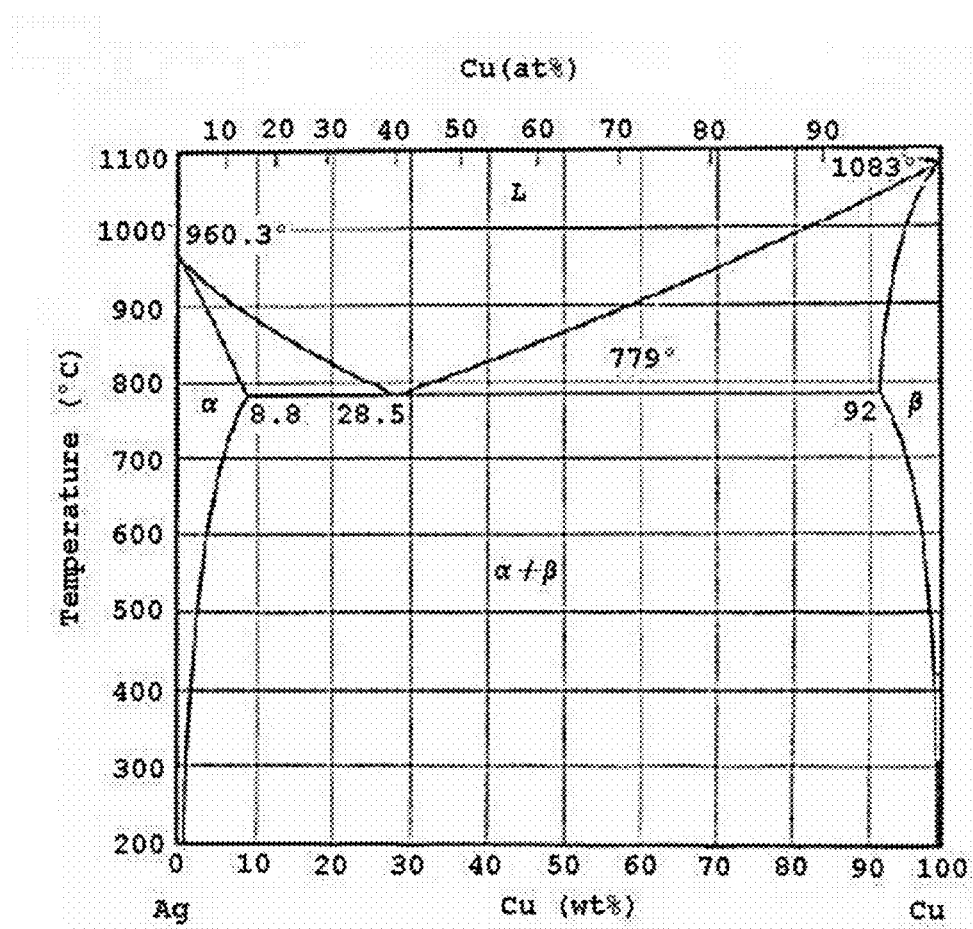
FIG. 7: This shows a phase equilibrium diagram of Ag—Cu alloy.

Silver-Copper Alloy Substantially not Containing Eutectic and Particles Thereof:

The silver-copper alloy of the present invention is the silver-copper alloy (AgCu alloy) which substantially does not contain the eutectic. Especially, it is the solid silver-copper alloy whose ratio of silver to copper (weight ratio and mole ratio) is in the solid phase $\alpha+\beta$ region in the phase equilibrium diagram of the Ag—Cu alloy (as one example thereof, a phase equilibrium diagram of Ag—Cu alloy is shown in FIG. 7). Generally, silver and copper form the eutectic in this region (the region in which copper concentration in the silver-copper alloy is in the range of 0.1 to 99.94% by weight); however, in the present invention, the silver-copper alloy comprises mainly the non-eutectic structure not containing the eutectic. Accordingly, the solid silver-copper alloy of the present invention is the solid silver-copper alloy in which concentration of copper contained in the silver-copper alloy is in the range of 0.1 to 99.94% by weight, preferably in the range of 0.5 to 99.5% by weight, or more preferably in the range of 1.0 to 99.00% by weight, and the said solid silver-copper alloy is the solid silver-copper alloy which has mainly the non-eutectic structure not containing the eutectic at room temperature. It is assumed that because of this, suppression of migration of silver, especially suppression of migration of a silver ion generated by ionization of silver is possible. The silver-copper alloy of the present invention is the silver-copper alloy which has mainly the non-eutectic structure not containing the eutectic body; and in the present invention, the term "silver-copper alloy which has mainly the non-eutectic structure" means that the silver-copper alloy has the non-eutectic structure with the amount thereof being preferably 65% or more by volume, or more preferably 80% or more by volume in the silver-copper alloy of the present invention. As to the non-eutectic structure in the present invention, a solid solution, an amorphous form, and the like may be exemplified.

As mentioned above, the inventor of the present invention observed the silver-copper alloy of the present invention with various instruments at room temperature, and then identified that the silver-copper alloy of the present invention was the solid silver-copper alloy which had mainly the non-eutectic structure not containing the eutectic body.

More specifically, it was confirmed that the silver-copper alloy was the silver-copper alloy which had mainly the non-eutectic structure not containing the eutectic body under the state that the silver-copper alloy was placed in the environment of microscopic analysis (TEM-EDS analysis or STEM-EDS analysis) used in the later-mentioned Examples at room temperature with the irradiation of an electron beam having the acceleration voltage of 200 kV. During this operation, temperature of the sample itself to which the electron beam was irradiated was not controlled. In addition, as to the silver-copper alloy particles that had been subjected to these observations, the DSC measurements were carried out in the later-mentioned Examples (2, 4, and 10); and it was confirmed that there were no changes in their states in the temperature range of room temperature to 180° C.

Figure 5:
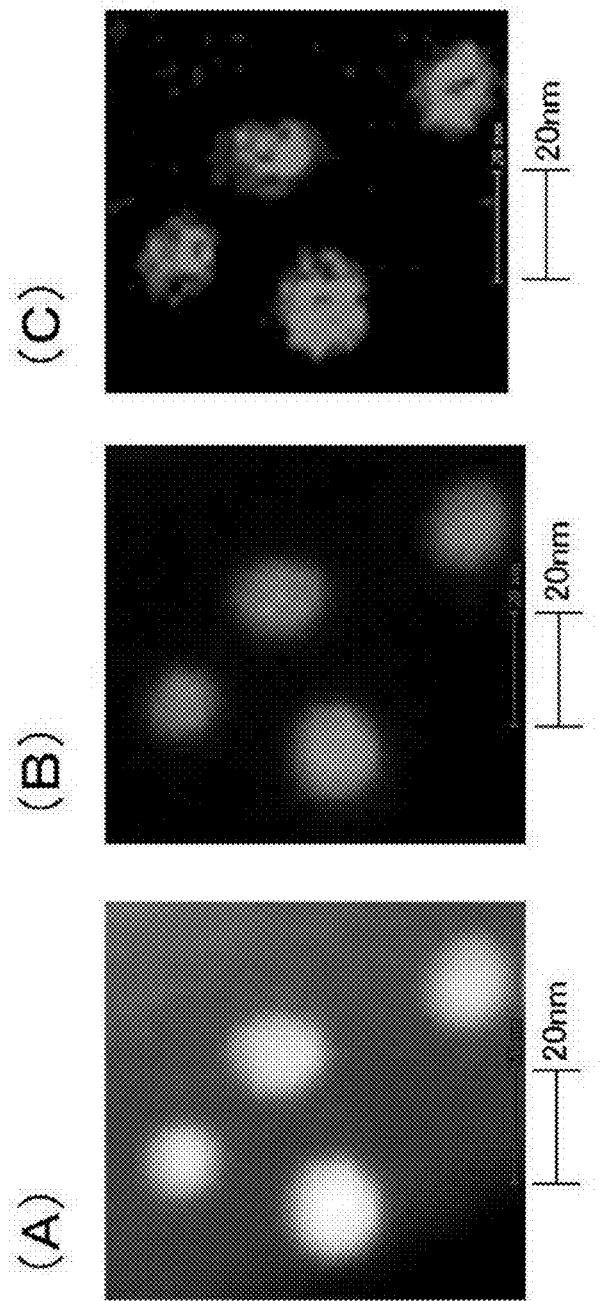
FIG. 5: This shows (A) the STEM-HAADF picture, (B) the EDS mapping result (Ag), and (C) the EDS mapping result (Cu) of the silver-copper alloy particles prepared in Example 4.
Figure 6:
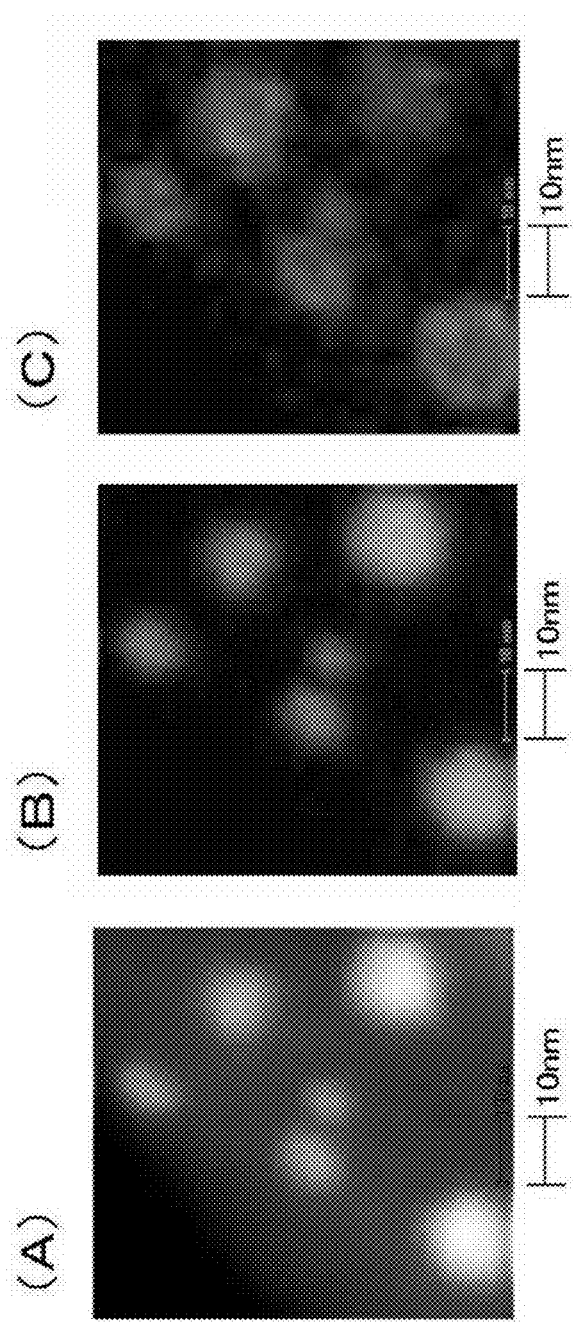
FIG. 6: This shows (A) the STEM-HAADF picture, (B) the EDS mapping result (Ag), and (C) the EDS mapping result (Cu) of the silver-copper alloy particles prepared in Example 8.

There is no particular restriction in the analysis method to measure the existence of the eutectic in the silver-copper alloy; however, a microscopic analysis is preferable, especially an analytical method with which distribution state of silver and copper, and in addition, the weight ratio or the mole ratio of silver to copper can be analyzed in an extremely small area is preferable. Illustrative example thereof includes the energy dispersive X-ray spectroscopy under observation with the transmission electron microscope (TEM-EDS), the energy dispersive X-ray spectroscopy under observation with the scanning electron microscope (SEM-EDS), the high resolution TEM (HRTEM), the high-angle annular dark-field scanning transmission electron microscopy (HAADF-STEM), the element mapping method using the scanning transmission electron microscopy (STEM), the energy dispersive X-ray spectroscopy under observation with the scanning transmission electron microscope (STEM-EDS), and the electron energy loss spectroscopy (EELS). Other methods may be used, too; but to demonstrate that the silver-copper alloy has the non-eutectic structure not containing the eutectic, spectroscopic analyses are preferable. As to the silver-copper alloy of the present invention which has mainly the non-eutectic structure not containing the eutectic, illustrative example thereof includes the silver-copper alloy particles such as those shown by the STEM-HAADF pictures shown in FIG. 4, FIG. 5, and FIG. 6 (FIG. 4(A), FIG. 5(A), and FIG. 6(A)) with the EDS mapping results of them (FIGS. 4(B) and 4(C), FIGS. 5(B) and 5(C), and FIGS. 6(B) and 6(C), wherein each (B) shows the mapping results of Ag, and each (C) shows the mapping results of Cu).

Figure 4:
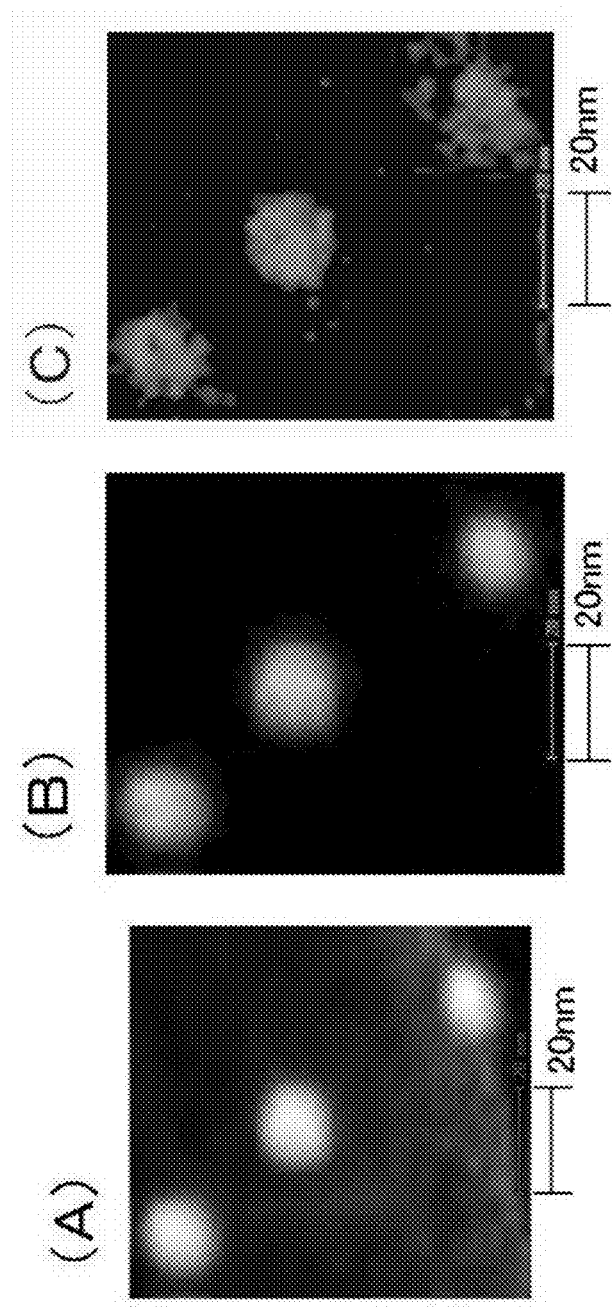
FIG. 4: This shows (A) the STEM-HAADF picture, (B) the EDS mapping result (Ag), and (C) the EDS mapping result (Cu) of the silver-copper alloy particles prepared in Example 2.

As to the silver-copper alloy particles shown in FIG. 4, ICP analysis result of the silver-copper alloy particle powders is Ag:Cu=85.5:14.5 (mole ratio); in other words, the concentration of copper contained in the silver-copper alloy is 9.1% by weight. As to the silver-copper alloy particles shown in FIG. 5, ICP analysis result of the silver-copper alloy particle powders is Ag:Cu=69.9:30.1 (mole ratio); in other words, the concentration of copper contained in the silver-copper alloy is 20.2% by weight. As to the silver-copper alloy particles shown in FIG. 6, ICP analysis result of the silver-copper alloy particle powders is Ag:Cu=95.0:5.0 (mole ratio); in other words, the concentration of copper contained in the silver-copper alloy is 3.0% by weight. In the silver-copper alloys mentioned above, it was not confirmed that silver and copper were clearly segregated in a single particle as can be seen in the respective EDS mapping results, even though ratios of silver to copper in entirety of the silver-copper alloy are in the solid phase $\alpha+\beta$ region in the phase equilibrium diagram of the Ag—Cu alloy; and in addition, the region of silver only or the region of copper only was not confirmed therein, nor was confirmed the particle of silver only or the particle of copper only.

In the silver-copper alloy of the present invention, as the result of analysis of mole ratios of silver to copper within the extremely small area by the beam diameter of 5 nm using TEM-EDS analysis, in 50% or more of the analysis points, the mole ratios of silver to copper are detected preferably within ±30% of the mole ratios of silver to copper obtained by the ICP analysis result.

Figure 12:
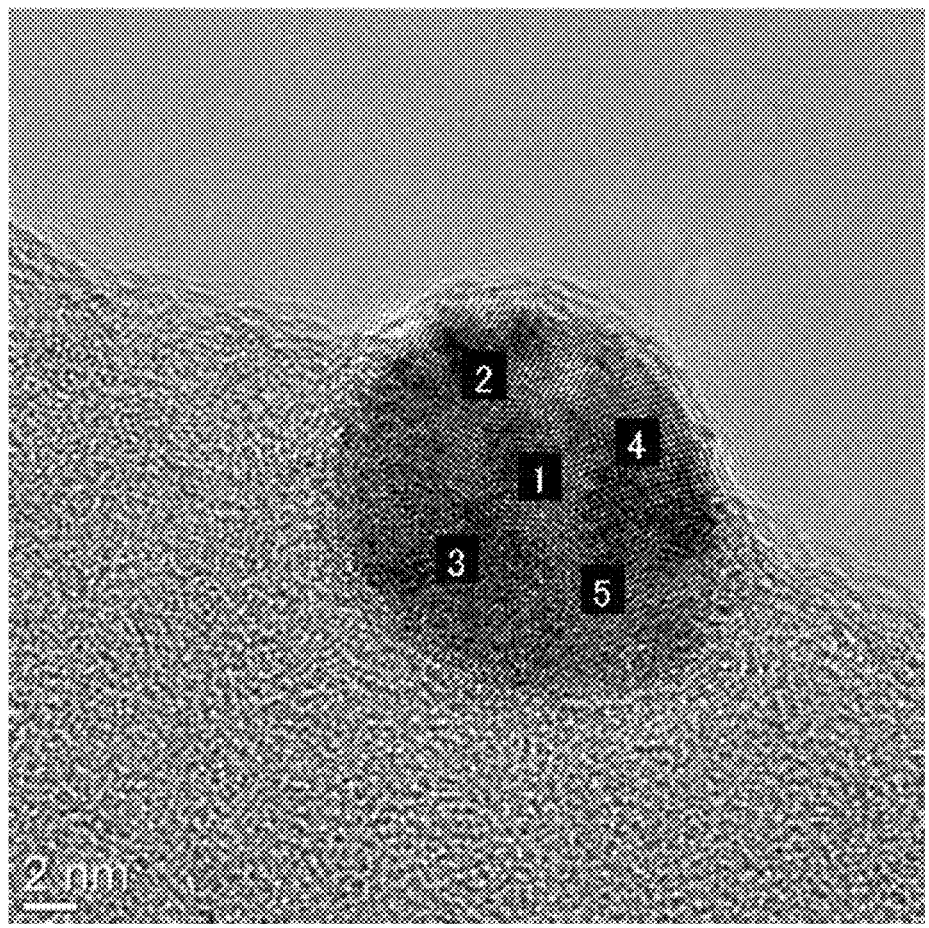
FIG. 12: This shows the HRTEM picture of the silver-copper alloy particle prepared in Example 10 and the TEM-EDS analysis points (5 points) in the silver-copper alloy particle of the said HRTEM picture.
Figure 13:
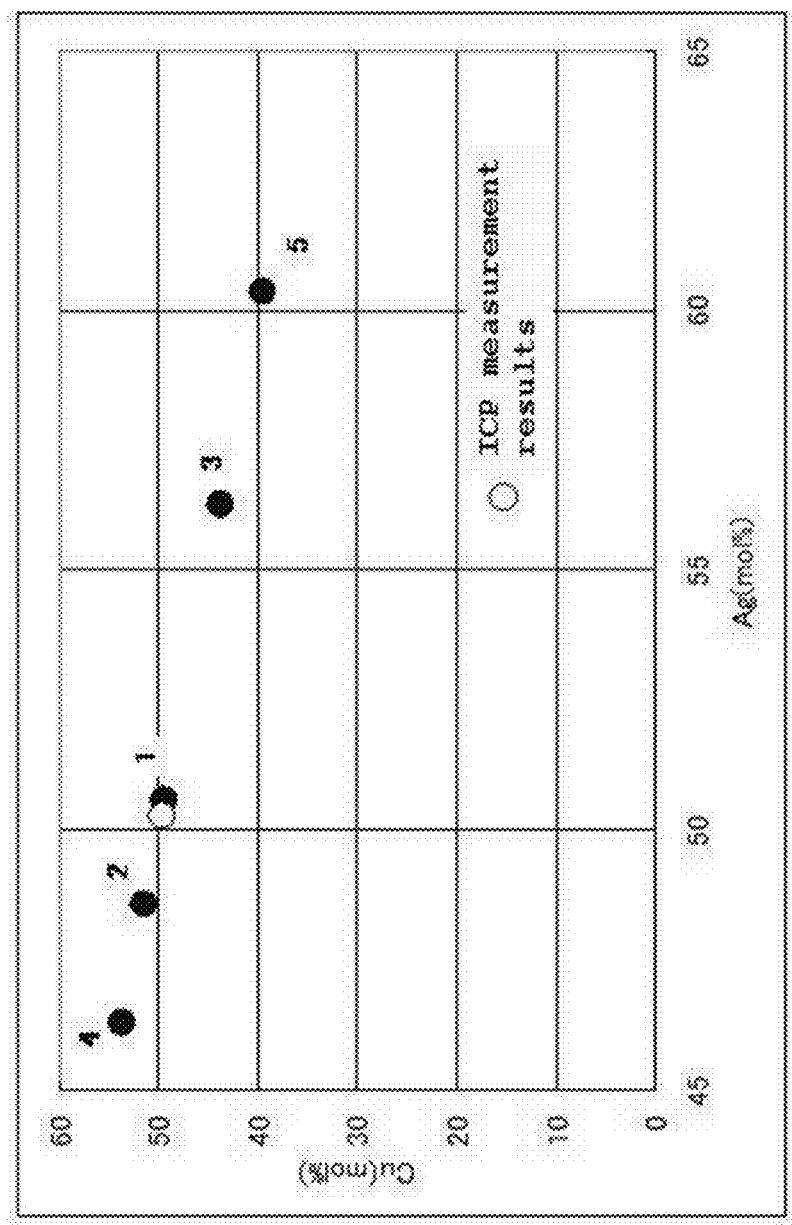
FIG. 13: This shows the TEM-EDS analysis results measured at each of the TEM-EDS analysis points, shown in FIG. 12, of the silver-copper alloy particle prepared in Example 10.

In FIG. 12, the HRTEM picture of the silver-copper alloy particle (Ag:Cu=50.3:49.7 (mole ratio)) and the TEM-EDS analysis points (5 points) by the beam diameter of 5 nm in this particle are shown; and in FIG. 13, the TEM-EDS analysis results measured in each analysis point shown in FIG. 12 are shown. As can be seen in the analysis results shown in FIG. 13, in 50% or more of the analysis points, the mole ratios of silver to copper in the TEM-EDS analysis are detected within ±30% of the mole ratios of silver to copper obtained by the ICP analysis result; and thus, this condition is satisfied.

If the silver-copper alloy particle had contained the eutectic therein, the analysis points with 100% of Ag and 100% of Cu as well as many analysis points having the silver-copper ratios of the $\alpha$-phase and the $\beta$-phase should have been detected. Therefore, it can be seen that the above-mentioned silver-copper metal alloy particle is the silver-copper alloy which does not contain the eutectic.

Figure 8:
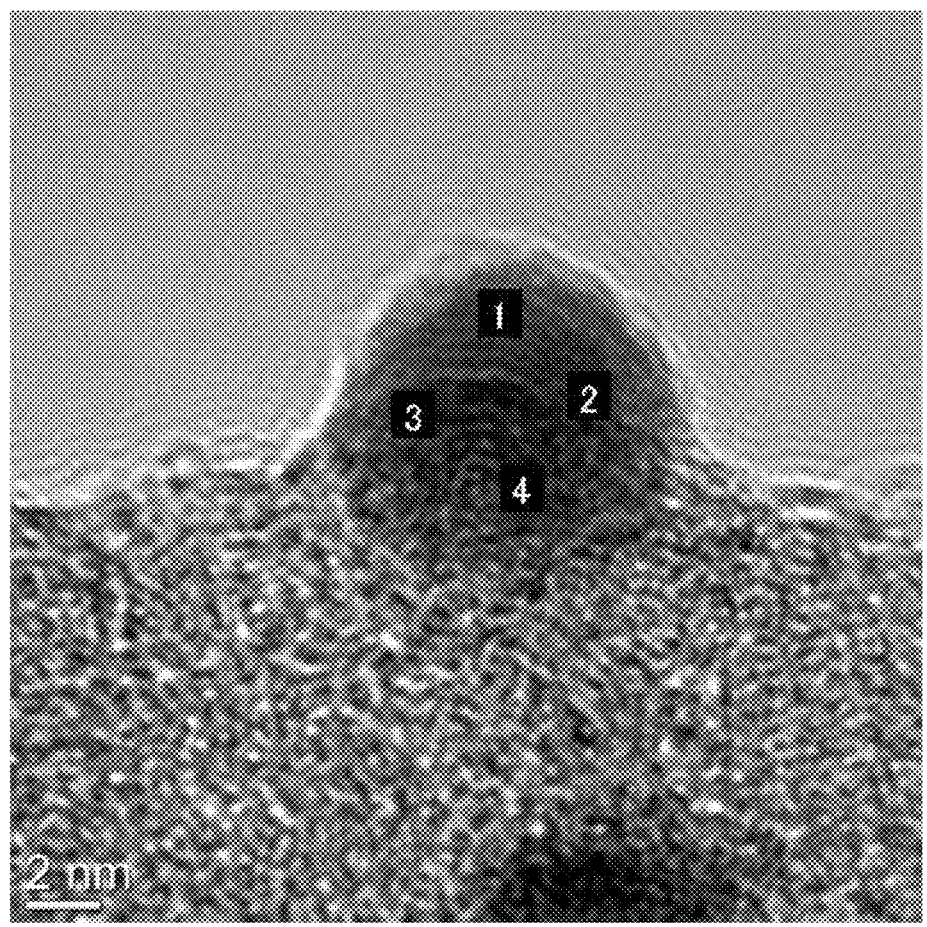
FIG. 8: This shows the HRTEM picture of the silver-copper alloy particle prepared in Example 8 and the STEM-EDS analysis points (4 points) in the silver-copper alloy particle of the said HRTEM picture.

In the silver-copper alloy of the present invention, as the result of analysis of mole ratios of silver to copper within the extremely small area by the beam diameter of 0.2 nm using STEM-EDS analysis, in 50% or more of the analysis points, the mole ratios of silver to copper are detected preferably within ±30% of the mole ratios of silver to copper obtained by the ICP analysis result. The 0.2-nm beam is nearly equal to the atomic radius of silver and of copper; however, in the actual observation, because informations of the depth direction and of the surrounding area are taken, it is possible to take informations substantially in the larger area than the atom size of silver and of copper. In FIG. 8, the HRTEM picture of the silver-copper alloy particle shown in FIG. 6 (Ag:Cu=95.0:5.0 (mole ratio)) and the STEM-EDS analysis points (4 points) by the beam diameter of 0.2 nm in this particle are shown; and in FIG. 9, the STEM-EDS analysis results measured at each analysis point in FIG. 8 are shown. As can be seen in the analysis results shown in FIG. 9, in 50% or more of the analysis points, the mole ratios of silver to copper in the STEM-EDS analysis are detected within ±30% of the mole ratios of silver to copper obtained by the ICP analysis result; and thus, this condition is satisfied. If the silver-copper alloy particle had contained the eutectic therein, the analysis points with 100% of Ag or 100% of Cu as well as many analysis points having the silver-copper ratios of the $\alpha$-phase and the $\beta$-phase should have been detected. Therefore, it can be seen that the above-mentioned silver-copper metal alloy particle is the silver-copper alloy which does not contain the eutectic.

Figure 10:
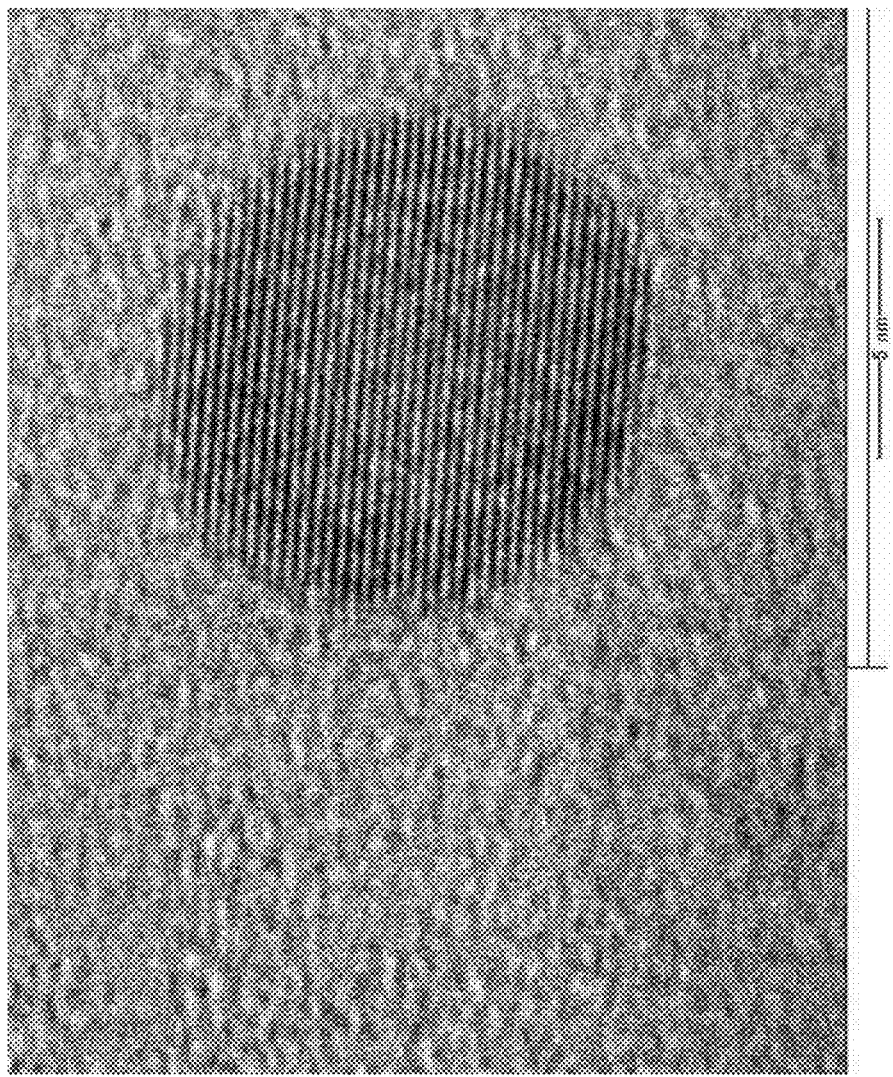
FIG. 10: This shows the TEM picture of the silver-copper alloy particle prepared in Example 10.

In addition, in the silver-copper alloy particle shown in FIG. 10 (Ag:Cu=50.3:49.7 (mole ratio); the copper concentration in the silver-copper alloy is 36.8% by weight), the lattice fringes (atomic arrays in crystal) are observed in one direction; and thus, it can be seen that the silver-copper alloy particle show in FIG. 10 does not have crystal grain boundary.

In the present invention, the beam diameter of the EDS analysis (energy dispersive X-ray spectrometric analysis) is different depending on the capacity of the apparatus to be used; however, for example, it is preferably 25 nm, more preferably 10 nm, or still more preferably 5 nm. In addition, depending on the analysis apparatus, it is more preferably 0.5 nm, or still more preferably 0.2 nm. In the present invention, Examples were carried out by using the beam diameter of 5 nm in the case of the TEM-EDS analysis; and the beam diameter of 0.2 nm was used in the case of the STEM-EDS analysis. In addition, as the observation condition of TEM or STEM, the magnifications of them are preferably 250,000 or more, or more preferably 500,000 or more.

As to the EDS analysis method, determination of the analysis site is not particularly restricted regardless of whether it is single site or plural sites; however, plural sites are preferable. In the case that the object of the analysis is particle, the EDS analysis may be done as to each of plural particles, or the EDS analysis may be done as to the plural sites of a single particle. For example, in the case that the particle diameter is 5 nm and the EDS beam diameter is 5 nm, the EDS analysis may be done as to plural particles, or the EDS analysis may be done as to plural sites of a single particle by slightly changing the irradiation site of the beam in the EDS analysis. Alternatively, in the case that the particle diameter is 5 nm and the EDS beam diameter is 0.2 nm, the EDS analysis may be done as to plural sites of a single particle.

The number of the EDS analysis sites is not particularly restricted; however, it is preferably 3 sites or more, more preferably 10 sites or more, or still more preferably 25 sites or more.

In the silver-copper alloy of the present invention, as the result of analysis of mole ratios of silver to copper within the extremely small area by the afore-mentioned beam diameters using the TEM-EDS analysis or the STEM-EDS analysis, in 50% or more, preferably in 65% or more, or more preferably 80% or more of the analysis points, the mole ratios of silver to copper are detected within ±30%, preferably within ±20%, or more preferably within ±10% of the mole ratios of silver to copper obtained by the ICP analysis result.

However, if the mole ratios exceed the range within ±30% of the mole ratios of silver to copper obtained by the ICP analysis result in 50% or more of the analysis points, the mole ratios of silver to copper in the analysis results of the extremely small area obtained by the TEM-EDS analysis or the STEM-EDS analysis are significantly different from the mole ratios of silver to copper obtained by the ICP analysis result; and thus, there is a possibility that the uniform silver-copper alloy may not be obtained.

There is no particular restriction as to the apparatus capable of carrying out the analyses as mentioned above. Illustrative example thereof includes, as the apparatus capable of carrying out the analysis by the energy dispersive X-ray spectroscopy under observation with the transmission electron microscope (TEM-EDS), the transmission electron microscope JEM-2100 (manufactured by JEOL Ltd.) equipped with the energy dispersive X-ray analyzer JED-2300 (manufactured by JEOL Ltd.); and as the energy dispersive X-ray spectroscopy under observation with the scanning transmission electron microscope (STEM-EDS), the high resolution transmission electron microscope Titan 80-300 (manufactured by FEI Company) equipped with the r-TEM EDS detector (manufactured by AMETEK, Inc.), and the atomic resolution analytical electron microscope JEM-ARM 200F (manufactured by JEOL Ltd.) equipped with the energy dispersive X-ray analyzer Centurio (manufactured by JEOL Ltd.).

Ratio of Silver to Copper:

The ratio of silver to copper (mole ratio) contained in the silver-copper alloy of the present invention is not particularly restricted. Both the silver-copper alloy having higher mole ratio of silver and the silver-copper alloy having higher mole ratio of copper may be used. Meanwhile, in the present invention, regardless of mole ratio of silver to copper contained in the silver-copper alloy, all the alloys comprising silver and copper are described as the silver-copper alloy.

Particle Diameter of Silver-Copper Alloy:

In the silver-copper alloy of the present invention, the silver-copper alloy particle having particle diameter of 50 nm or less is preferable. More preferable is the silver-copper alloy having particle diameter of 25 nm or less; and still more preferable is the silver-copper alloy particle having particle diameter of 10 nm or less. This is because the particle whose particle size is in the order of nanometer shows unique physical characteristics such as lowered melting point and lowered sintering temperature due to the quantum size effect thereof. For example, as the progress of nanotechnology in recent years, as the material to form a circuit on a plastic substrate by the coating and burning process, an electrically conductive paste and the like for formation of an electronic circuit by using nanoparticles are wanted; and the unique physical characteristics mentioned above may satisfy such needs among others. In the silver-copper alloys of the present invention including those silver-copper alloys shown in respective drawings, the particle diameters thereof were 50 nm or less in the obtained silver-copper alloy; and there existed even the silver-copper alloy particles having the particle diameters of 25 nm or less as well as 10 nm or less.

In addition, the silver-copper alloy of the present invention is the silver-copper alloy particle not requiring heat-treatment by the dry process.

As is the case with many other alloys, the silver-copper alloy of the present invention may contain minute amount of impurities in a certain instance; and thus, in the present invention the silver-copper alloy may contain intentionally or unintentionally an element other than silver or copper. The element that can be intentionally contained therein may be exemplified by tin element. The ratio of the element like this is not particularly restricted; however, if the purpose thereof is for soldering, the range of tin:silver:copper is preferably 95.0 to 93.0:5.0 to 3.0:2.0 to 0.5 (mole ratio). Elements other than tin are not particularly restricted; and thus all elements may be mentioned, while illustrative example thereof includes gold, palladium, nickel, chromium, manganese, vanadium, iron, and molybdenum. If other metals are thought to be contained therein unintentionally as impurities, the ratio thereof is, though not particularly restricted, preferably less than 0.05% by weight, more preferably less than 0.02% by weight, or still more preferably less than 0.01%, relative to entirety of the silver-copper alloy.

Production Method 1 of Silver-Copper Alloy Particle: Overview

Method for producing the above-mentioned silver-copper alloy is not particularly restricted. Any of the method involving pyrolysis of a silver and a copper compound and the method involving reduction of a silver and a copper ion may be used; however, the production method of the silver-copper alloy particle in which a fluid which contains a silver ion and a copper ion is mixed with a fluid which contains a reducing agent thereby separating particles of the silver-copper alloy is preferable. Alternatively, the production method of the silver-copper alloy particle in which a fluid which contains a silver ion, a fluid which contains a copper ion, and a fluid which contains a reducing agent are mixed to separate particles of the silver-copper alloy may also be used. As to the fluid which contains a reducing agent, any of a fluid which contains one reducing agent and a fluid which contains at least two reducing agents may be used. If the fluid which contains at least two reducing agents is used as the fluid which contains a reducing agent, the separation times of silver and copper can be controlled so that silver and copper can be separated substantially simultaneously; and thus, there is an advantage that the separation can takes place so as to form the silver-copper alloy. If the fluid which contains only one reducing agent is used, it is thought that control of the separation times of silver and copper is difficult thereby tending to separate silver and copper as the respective single bodies; however, the present invention does not exclude the use of the fluid which contains only one reducing agent as the fluid which contains a reducing agent.

Alternatively, as the fluid which contains a reducing agent, two fluids comprising a first fluid which contains at least one reducing agent and a second fluid which contains at least one reducing agent that is different from the reducing agent used in the first fluid may also be used.

Production Method 2 of Silver-Copper Alloy Particle: A Fluid which Contains a Silver Ion and a Copper Ion, and a Fluid which Contains a Silver Ion and a Fluid which Contains a Copper Ion The fluid which contains a silver ion and a copper ion, or the fluid which contains a silver ion and the fluid which contains a copper ion are not particularly restricted; however, a solution containing a silver ion and a copper ion, or a solution containing a silver ion and a solution containing a copper ion are preferable. Illustrative example of the method to prepare them includes a method in which metal single body such as silver or copper is dissolved in hydrochloric acid, nitric acid, aqua regia, or the like, and a method in which a silver or a copper compound is dissolved in a solvent. In addition, the fluid which contains a silver ion and a copper ion may be obtained by dissolving a silver single body and/or a silver compound and a copper single body and/or a copper compound in a solvent all at once, or the fluid which contains a silver ion and a copper ion may be obtained by mixing a silver solution obtained by dissolving a silver single body and/or a silver compound in a solvent with a copper solution obtained by dissolving a copper single body and/or a copper compound in a solvent.

Compounds:

There are no restrictions as to the silver compound or the copper compound; and illustrative example thereof includes silver or copper in the form of salts, oxides, nitrides, carbides, complexes, organic salts, organic complexes, and organic compounds. There are no restrictions as to the silver salt or the copper salt; and illustrative example thereof includes nitrate salts, nitrite salts, sulfate salts, sulfite salts, formate salts, acetate salts, phosphate salts, phosphite salts, phosphinate salts, chlorides, oxy salts, and acetyl acetonato salts. Illustrative example of the other compounds includes silver alkoxides and copper alkoxides.

Solvents:

The fluid which contains a silver ion and a copper ion, or the fluid which contains a silver ion and the fluid which contains a copper ion may be prepared by mixing the silver single body and/or the silver compound and/or the copper single body and/or the copper compound with a solvent, or preferably by dissolving or molecular-dispersing these substances in a solvent. In addition, the silver single body and/or the silver compound and/or the copper single body and/or the copper compound may be used by arbitrarily selecting from them in accordance with an intended purpose. As the solvent to dissolve the silver single body and/or the silver compound and/or the copper single body and/or the copper compound, water, an organic solvent, or a mixture of them may be exemplified.

Illustrative example of the water includes a tap water, an ion-exchanged water, a purified water, a ultrapurified water, and a RO water; and illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxid compound solvent, a halogen compound solvent, an ester compound solvent, an ionic liquid, a carboxylic acid compound, and a sulfonic acid compound. These solvents each may be used solely or as a mixture of two or more of them.

Alternatively, a basic substance or an acidic substance may be used by mixing it with or dissolving it into the forgoing solvents Illustrative example of the basic substance includes metal hydroxides such as sodium hydroxide and potassium hydroxide, metal alkoxides such as sodium methoxide and sodium isopropoxide, and amine compounds such as triethylamine, 2-diethylaminoethanol, and diethylamine. Illustrative example of the acidic substance includes inorganic acids such as aqua regia, hydrochloric acid, nitric acid, fuming nitric acid, sulfuric acid, and fuming sulfuric acid; and organic acids such as formic acid, acetic acid, chloroacetic acid, dichloroacetic acid, oxalic acid, trifluoroacetic acid, and trichloroacetic acid. These basic substances or acidic substances may be respectively used solely or as a mixture with the solvents mentioned before.

Detailed Explanation of Solvents:

To explain the solvents mentioned above in more detail, illustrative example of the alcohol compound solvent includes methanol, ethanol, isopropanol, n-propanol, 1-methoxy-2-propanol, a linear alcohol such as n-butanol; branched alcohols such as 2-butanol and tert-butanol; polyalcohols such as ethylene glycol and diethylene glycol; and propylene glycol monomethyl ether. Illustrative example of the ketone compound solvent includes acetone, methyl ethyl ketone, and cyclohexanone. Illustrative example of the ether compound solvent includes dimethyl ether, diethyl ether, and tetrahydrofurane. Illustrative example of the aromatic compound solvent includes benzene, toluene, xylene, nitrobenzene, chlorobenzene, and dichlorobenzene. Illustrative example of the aliphatic compound solvent includes hexane. Illustrative example of the nitrile compound solvent includes acetonitrile. Illustrative example of the sulfoxide compound solvent includes dimethyl sulfoxide, diethyl sulfoxide, hexamethylene sulfoxide, and sulfolane. Illustrative example of the halogen compound solvent includes chloroform, dichloromethane, trichloroethylene, and iodoform. Illustrative example of the ester compound solvent includes ethyl acetate, butyl acetate, methyl lactate, ethyl lactate, and 2-(1-methoxy)propyl acetate. Illustrative example of the ionic liquid includes a salt between 1-butyl-3-methylimidazolium and PF6-(hexafluorophosphate ion). Illustrative example of the amide compound solvent includes N,N-dimethylformamide, 1-methyl-2-pyrrolidone, 2-pyrrolidinone, 1,3-dimethyl-2-imidazolidinone, epsilon-caprolactam, formamide, N-methylformamide, acetamide, N-methylacetamide, N,N-dimetnylacetamide, N-methylpropanamide, and hexamethylphosphoric triamide. Illustrative example of the carboxylic acid compound includes 2,2-dichloropropionic acid and squaric acid. Illustrative example of the sulfonic acid compound includes methanesulfonic acid, p-toluenesulfonic acid, chlorosulfonic acid, and trifluoromethanesulfonic acid.

Reducing Agents:

There is no particular restriction as to the reducing agent, so that any reducing agents capable of reducing a silver ion and/or a copper ion may be used. Illustrative example thereof includes hydride reducing agents such as sodium borohydride and lithium borohydride; aldehydes such as formalin and acetaldehyde; sulfite salts; carboxylic acids and lactones such as formic acid, oxalic acid, succinic acid, and ascorbic acid; aliphatic monoalcohols such as ethanol, butanol, and octanol; alicyclic alcohol such as terpineol; aliphatic diols such as ethylene glycol, propylene glycol, diethylene glycol, and dipropylene glycol; polyalcohols such as glycerin and trimethylolpropane; polyethers such as polyethylene glycol and polypropylene glycol; alkanol amines such as diethanol amine and monoethanol amine; and hydroquinone, resorcinol, aminophenol, glucose, sodium citrate, hypochlorous acid or its salts, transition metal ions (such as titanium ion and iron ion), hydrazines, and amines.

Reducing Agents: Hydrazines and Amines

In the present invention, at least one reducing agent selected from the above-mentioned reducing agents is used. It is preferable to use at least 2 reducing agents selected from the above-mentioned reducing agents in order to control the reduction rates of silver and copper, or to control the separating times of silver and copper. It is more preferable to use at least 2 reducing agents selected from hydrazines and amines; and still more preferably to use at least one kind selected from hydrazines and at least one kind selected from amines. There is no particular restriction as to the hydrazines; and illustrative example thereof includes hydrazine, hydrazine monohydrate, hydrazine carbonate, hydrazinium sulfate, phenyl hydrazine, 1-methyl-1-phenyl hydrazine, and 1,1-diphenyl hydrazine hydrochloride salt. There is no particular restriction as to the amines; and illustrative example thereof includes compounds shown by the formulae $R^a NH_2$, $R^a R^b NH$, and $R^a R^b R^c N$, or their salts (in the formulae, $R^a$, $R^b$, and $R^c$ represent the same group or different groups with each other, wherein $R^a$ and $R^b$ may optionally be bonded with each other to form a cyclic amino group together with the neighboring nitrogen atom). Illustrative example thereof includes triethylamine, triethanol amine, and dimethylamino ethanol.

By using at least 2 reducing agents, as mentioned above, the reduction rates of silver and copper, or the separating times of silver and copper may be controlled. The mechanism as to how it works has yet to be clarified; however, inventors of the present invention assume that if an attempt is made to reduce silver and copper which have different characteristics, especially silver and copper which have different standard electrode potentials ($Cu^{2+}+2e^- \Leftrightarrow Cu$: +0.337 V, and $Ag^+ + e^- \Leftrightarrow Ag$: +0.799 V) by a single reducing agent, nobler and more readily reducible silver tends to be reduced and separated faster than copper thereby tending to separate out as the silver single body and the copper single body respectively, or as an alloy which contains the eutectic; however, if at least 2 reducing agents are used, facilitation of the rates of reduction and separation of copper, or retardation of the rates of reduction and separation of silver, or both of them may occur to give rise the effect to simultaneous separation of silver and copper. Accordingly, the silver-copper alloy of the present invention tends to have a non-eutectic structure not containing an eutectic body readily; and as a result, uniform and homogenous silver-copper alloy particles as confirmed by the later-mentioned Examples can be produced by mixing a fluid which contains a silver ion and a copper ion with a fluid which contains a reducing agent by using the fluid processing apparatus described in Patent Document 5 to cause separation of the silver-copper alloy particles.

Fluid which Contains Reducing Agent:

The fluid which contains a reducing agent contains preferably at least one reducing agent mentioned above; and in addition, the reducing agent is preferably in the state of solution, or in the state of being dissolved or molecular dispersed by mixing with a solvent. There is no particular restriction as to the solvent. The solvents mentioned before may be used in accordance with the purpose. The fluid which contains the reducing agent may include the states such as dispersion solution and slurry solution at the time of execution thereof.

In addition, as the fluid which contains a reducing agent, as mentioned above, a fluid which contains at least two reducing agents may be used, or alternatively, two fluids comprising a first fluid which contains at least one reducing agent and a second fluid which contains at least one reducing agent that is different from the reducing agent used in the first fluid may also be used.

As to pH: The Fluid which Contains Silver and Copper Ions or the Fluid which Contains Silver Ion and the Fluid which Contains Copper Ion, the Fluid which Contains Reducing Agent, and the Fluid after Mixing In the present invention, pH of each of the fluids is not particularly restricted. It can be arbitrarily changed in accordance with mole ratio of silver to copper, particle diameter, crystallinity, and so force in the intended silver-copper alloy particle. Adjustment of pH of the fluid which contains silver and copper ions or the fluid which contains a silver ion and the fluid which contains a copper ion, and the fluid which contains a reducing agent may be executed by adding the afore-mentioned acidic substance or basic substance to the respective fluids; or pH may be changed by the silver compound, the copper compound, or the reducing agent to be used, or by the respective concentrations.

In addition, pH of the fluid after mixing the fluid which contains a silver ion and a copper ion, or the fluid which contains a silver ion and the fluid which contains a copper ion, with the fluid which contains a reducing agent is not particularly restricted; however, it is preferably in the range of 7 to 14, more preferably in the range of 8 to 13, or still more preferably in the range of 11 to 13. To be in more detail, if pH of the fluid after mixing the fluid which contains a silver ion and a copper ion, or the fluid which contains a silver ion and the fluid which contains a copper ion, with the fluid which contains a reducing agent is 7 or less, reduction of a silver ion or of a copper ion tends to be insufficient, and in addition, control of the reduction rates of silver and copper tends to be difficult. If pH of the fluid after the mixing is higher than 14, oxygen-containing compounds of silver and of copper, for example, hydroxides and oxides thereof tend to be produced readily. Especially pH of the fluid after the mixing is preferably in the range of 11 to 13, because within this range silver and copper in the produced silver-copper alloy particles tends to be highly uniform not only among respective plural particles but also within the individual particle. In addition, there is no particular restriction as to the method for adjustment of pH of the fluid after the mixing. The adjustment of pH may be executed by adjusting pH of each of the fluids or by changing flow rate of each fluid such that pH of the fluid after the mixing may fall in the above-mentioned pH range.

Meanwhile, in Examples, it was difficult to measure pH of the fluid immediately after mixing of the fluid which contains a silver ion and a copper ion with the fluid which contains a reducing agent; and thus, pH of the fluid discharged from between the processing surfaces 1 and 2 of the later-described fluid processing apparatus was measured.

Temperature:

There is no particular restriction as to the temperature of each of the fluids of the present invention. Similarly to pH, the respective temperatures can be arbitrarily changed in accordance with mole ratio of silver to copper, particle diameter, crystallinity, and so force in the intended silver-copper alloy particle.

Dispersant and so Forth:

In the present invention, various dispersing agents and surfactants may be used in accordance with the object and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various kinds of polymers. These may be used singly or as a combination of two or more of them. Among the dispersants, some of them have a reducing property; and as the example of it, polyvinylpyrrolidone and octylamine may be mentioned.

The surfactant and the dispersant mentioned above may be contained in any one of the fluids to be used in production of the silver-copper alloy particle, i.e., the fluid which contains a silver ion and a copper ion, the fluid which contains a silver ion and the fluid which contains a copper ion, and the fluid which contains a reducing agent, or in a plurality of these fluids to be used. Alternatively, the surfactant and the dispersant may be contained in a third fluid which is different from the fluid which contains a silver ion and a copper ion, the fluid which contains a silver ion and the fluid which contains a copper ion, and the fluid which contains a reducing agent. Especially, in order to improve dispersibility, it is preferable that the dispersant and so forth be added in advance into at least one fluid selected from the fluid which contains a reducing agent, the fluid which contains a silver ion and a copper ion, and the fluid which contains a silver ion and the fluid which contains a copper ion.

Fluid Processing Apparatus:

In the present invention, it is preferable that the fluid which contains a silver ion and a copper ion be mixed with the fluid which contains a reducing agent in a thin film fluid formed between processing surfaces which are disposed in a position they are faced with each other so as to be able to approach to and separate from each other, at least one of which rotates relative to the other, whereby separating the silver-copper alloy particles; and it is preferable that the mixing be carried out by using the fluid-processing apparatus described in Patent Document 5 filed by the present applicant to separate the silver-copper alloy particles. Hereunder, embodiments of the fluid-processing apparatus will be explained by using the drawings.

Explanation of Fluid Processing Apparatus

Figure 1:
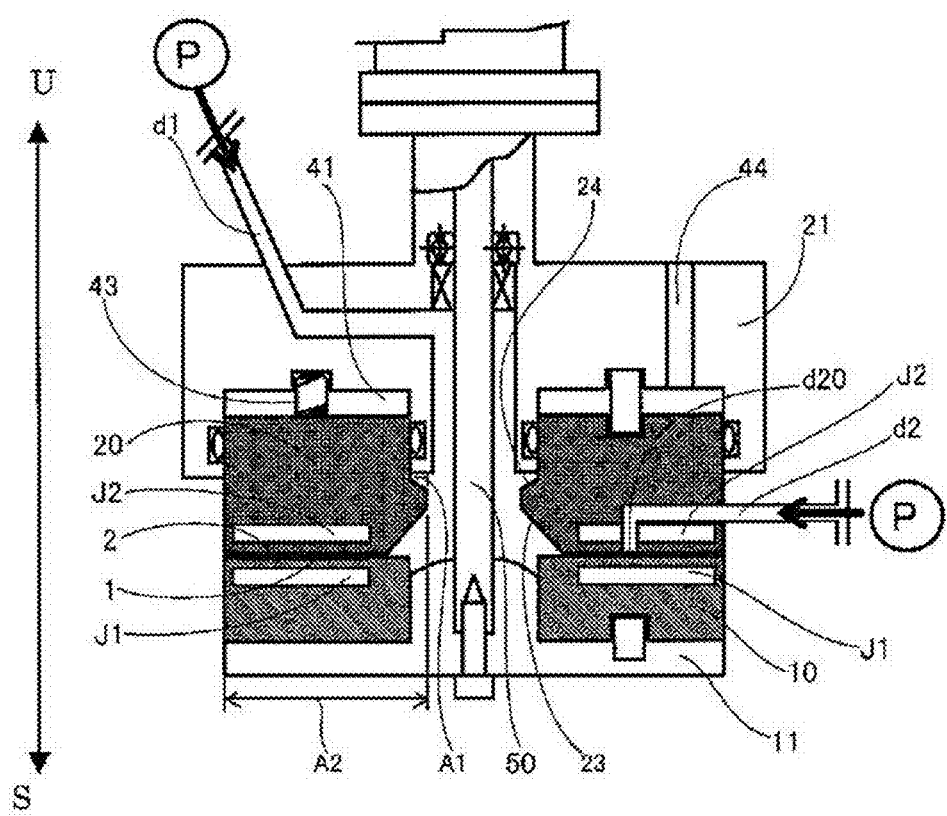
FIG. 1: This shows a rough sectional view of the fluid processing apparatus according to the embodiment of the present invention.
Figure 2:
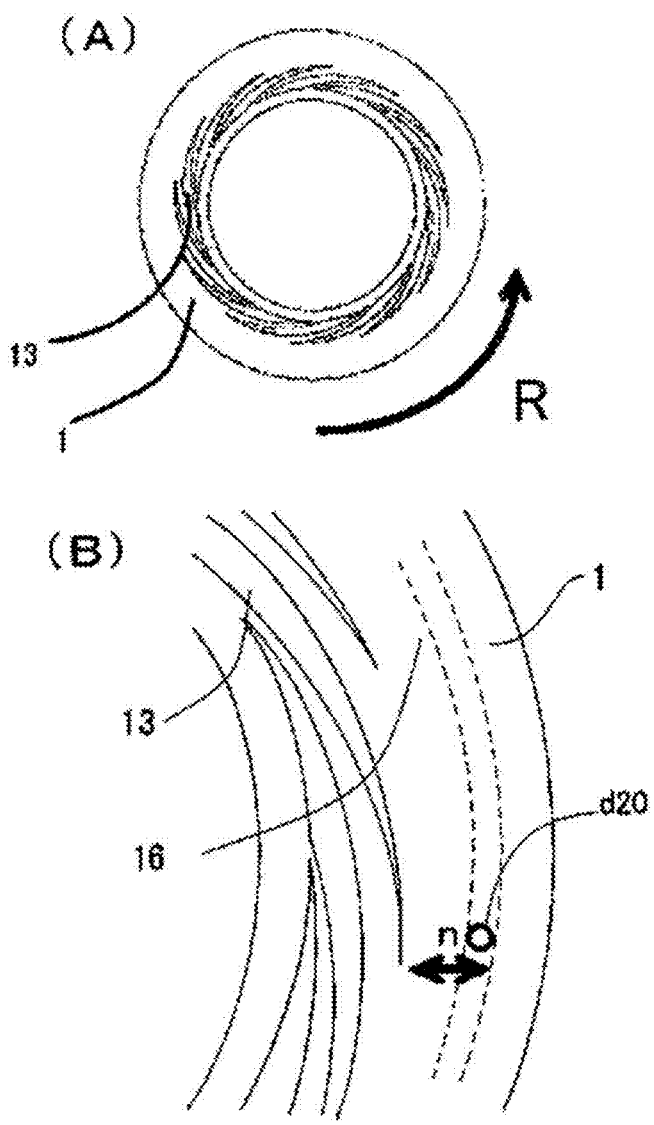
FIG. 2: This shows (A) a rough plane view of the first processing surface of the fluid processing apparatus shown in FIG. 1, and (B) an enlarged drawing of the essential part of the processing surface of the said apparatus.
Figure 3:
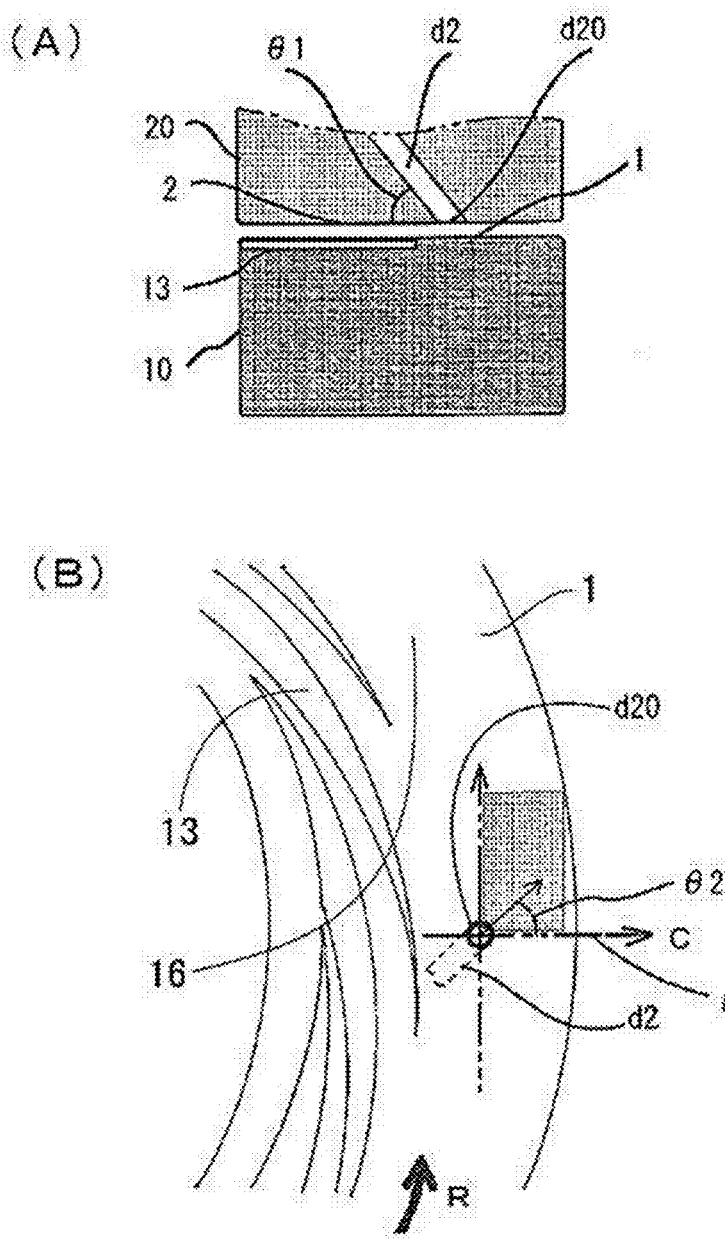
FIG. 3: This shows (A) a cross section view of the second introduction part of the said apparatus, and (B) an enlarged drawing of the essential part of the processing surface to explain the said second introduction part.

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used as the fluid to be processed, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually less than 1 mm, for example, in the range of about 0.1 μm to about 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process (ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, or more specifically a disk with a ring form. Similarly, the second processing member 20 is a disk with a ring form. A material of the processing members 10 and 20 is not only metal but also carbon, ceramics, sintered metal, abrasion-resistant steel, sapphire, other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both of the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to deviate the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2 under the state that pressure is applied thereto by a fluid pressure imparting mechanism p consisting of various pumps, potential energy, and so on. In this embodiment, the first introduction part d1 is a flow path arranged in the center of the circular second holder 21, and one end thereof is introduced into between the processing surfaces 1 and 2 from inside the circular processing members 10 and 20. Through the second introduction part d2, the second fluid to be processed for reaction to the first fluid to be processed is introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and second processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate a force (hereinafter "surface-approaching pressure") to press the first processing surface 1 of the first processing member 10 and the second processing surface 2 of the second processing member 20 in the direction to make them approach to each other. By the balance between this surface-approaching pressure and the force to separate the processing surfaces 1 and 2 from each other, i.e., the force such as the fluid pressure, a thin film fluid having minute thickness in a level of nanometer or micrometer is generated. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both of the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical, seal. The ratio (area ratio A1/A2) of a projected area A1 of the approach controlling surface 24 projected on a virtual plane perpendicular to the direction of approaching and separating the processing surfaces 1 and 2, that is, to the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both of the first and second processing surfaces 1 and 2. By forming the depression 13 as mentioned above, the micro-pump effect can be obtained so that the fluid to be processed may be sucked into between the first and second processing surfaces 10 and 20.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces.

Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. The shape of the opening part d20 may be circular as shown by solid lines in FIG. 2(B) and FIG. 3(B), or a concentric circular ring of annular shape surrounding the opening in the center of the processing surface 2 having the ring disk shape as shown by dotted lines in FIG. 2(B).

If the opening part d20 having an annular shape is arranged so as to be concentric circular ring surrounding the opening in the center of the processing surface 2, the second fluid to be introduced into between the processing surfaces 1 and 2 can be introduced to a wide range in the circumferential direction with the same condition; and thus, the fluid processing, including diffusion, reaction, and separation, can be done more uniformly. In order to produce large quantities of fine particles, the opening part d20 is preferably in the shape of annular shape, while it is not necessary that the opening part d20 having an annular shape be arranged so as to be concentric circular ring surrounding the opening in the center of the processing surface 2. If the opening part having the annular shape is used, the said opening part having the annular shape may be continuous or discontinuous.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

In the above-mentioned apparatus, a treatment such as separation/precipitation and crystallization is effected while being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, one example of specific embodiment of the production method of the silver-copper alloy particles by using the above-mentioned apparatus will be explained.

The separation reaction of the silver-copper alloy particles takes place while forcibly homogeneous mixing the fluids between the processing surfaces 1 and 2 which are disposed in a position they are faced with each other so as to be able to approach to and separate from each other, at least one of which rotates relative to the other in the apparatus shown in FIG. 1 of the present application.

At first, a fluid which contains the silver ion and copper ion is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the fluid which contains a reducing agent is introduced as the second fluid into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure applied between the rotating processing surfaces, thereby effecting the reaction to separate the silver-copper alloy particle.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

It is said that the migration of silver is the phenomenon in which silver is ionized to give a silver ion, which then reacts with a hydroxide ion ($OH^-$) contained in water to give silver hydroxide; and this reversible reaction is repeated while moving in the solid body to be separated and segregated as silver. However, by using the apparatus described above, fine crystalline particles without a lattice defect can be obtained in the silver-copper alloy; and thus, it is advantageous that the silver-copper alloy particle having the migration suppressed more than before can be obtained.

Meanwhile, in the observation with an electron microscope (TEM) in each of Examples of the present invention, there was no clear lattice defect thereof confirmed.

As mentioned before, the processing apparatus may be provided with, in addition to the first introduction part d1 and the second introduction part d2, the third introduction part d3; and in this case, for example, each of the fluids which contains a silver ion as the first fluid, the fluid which contains a copper ion as the second, and the fluid which contains a reducing agent as the third may be introduced into the apparatus. By so doing, concentration and pressure of each fluid can be controlled separately so that the separation reaction of the silver-copper alloy particles may be controlled more precisely. Similarly, the processing apparatus may be provided with, in addition to the first introduction part d1, the second introduction part d2, the third introduction part d3, and the fourth introduction part d4; and in this case, for example, each of the fluids which contains a silver ion as the first fluid, the fluid which contains a copper ion as the second fluid, the fluid which is the first reducing fluid containing at least one reducing agent as the third fluid, and the fluid which is the second reducing fluid containing at least one reducing agent different from the reducing agent used in the first reducing fluid as the fourth fluid may be introduced into the apparatus. By so doing, concentration and pressure of each solution can be controlled separately so that the separation reaction and stabilization of particle diameter of the microparticles may be controlled more precisely. Meanwhile, a combination of the fluids to be processed (first to fourth fluids) that are introduced into the respective introduction parts may be set arbitrarily. The same is applied if the fifth or more introduction parts are arranged; and by so doing, fluids to be introduced into the processing apparatus may be subdivided. In this case, it is preferable that the fluid which contains a silver ion and the fluid which contains a copper ion be joined together before joining with the fluid which contains a reducing agent; and it is also preferable that the first reducing fluid and the second reducing fluid be joined together before joining with the fluid which contains a silver ion and a copper ion.

In addition, temperatures of the fluids to be processed such as the first fluid, the second fluid, and so on may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

EXAMPLES

Hereunder, the present invention will be explained more specifically with referring to Examples. However, the present invention is not limited to the following Examples.

Meanwhile, in the following Examples, the term "from the center" means "from the first introduction part d1" of the processing apparatus shown in FIG. 1; the first fluid means the first fluid to be processed which is introduced from the first introduction part d1; and the second fluid means the second fluid to be processed which is introduced from the second introduction part d2 of the processing apparatus shown in FIG. 1. In addition, the opening part d20 of the second introduction part d2 having the shape of a concentric circular ring of annular shape surrounding the opening in the center of the processing surface 2 as shown by dotted lines in FIG. 2(B) was used.

TEM-EDS Analysis:

The element mapping and the quantitative analyses of silver and copper in the silver-copper alloy particles by TEM-EDS were carried out by the transmission electron microscope JEM-2100 (manufactured by JEOL Ltd.) equipped with the energy dispersive X-ray analyzer JED-2300 (manufactured by JEOL Ltd.). The analysis was done by using the beam diameter of 5 nm to calculate the mole ratio of silver to copper in the silver-copper alloy particles. Specifically, 5 analysis points shown in FIG. 12 were chosen in each of 10 of the obtained silver-copper alloy particle; and mole ratios of silver to copper at respective analysis points were calculated, from which values the average value was used.

Specific conditions of the TEM observation and the TEM-EDS analysis were as follows; a sample of the silver-copper alloy particles was mounted on the transmission electron microscope at room temperature, and an electron beam was irradiated to the sample of the silver-copper alloy particles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the silver-copper alloy particles.

Meanwhile, the acceleration voltage of the electron beam to irradiate the silver-copper alloy particles can be set arbitrarily to approximately several hundred kV by the used transmission electron microscope.

STEM-EDS Analysis:

The element mapping and the quantitative analyses of silver and copper in the silver-copper alloy particles by STEM-EDS were carried out by the ultra-high resolution transmission electron microscope TITAN 80-300 (manufactured by FEI company) equipped with the γ-TEM EDS detector (manufactured by Ametek Inc.), and the atomic resolution analytical electron microscope JEM-ARM200F (manufactured by JEOL Ltd.) equipped with the energy dispersive X-ray analyzer Centurio (manufactured by JEOL Ltd.). The analysis was done by using the beam diameter of 0.2 nm to calculate the mole ratio of silver to copper in the silver-copper alloy particles. Specifically, 4 analysis points shown in FIG. 8 were chosen in each of 10 of the obtained silver-copper alloy particles; and mole ratios of silver to copper at respective analysis points were calculated, from which values the average value was used.

Specific conditions of the STEM observation, the HRTEM observation, and the STEM-EDS analysis were as follows; a sample of the silver-copper alloy particles was mounted on the scanning transmission electron microscope at room temperature, and an electron beam was irradiated to the sample of the silver-copper alloy particles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the silver-copper alloy particles.

Meanwhile, the acceleration voltage of the electron beam to irradiate the silver-copper alloy particles can be set arbitrarily to approximately several hundred kV by the used electron microscopes.

ICP Analysis:

Quantitative analyses of silver and copper contained in the dried powders of the silver-copper alloy particles by the inductively coupled plasma atomic emission spectrophotometry (ICP) were carried out by using ICPS-8100 (manufactured by Shimadzu Corp.).

XRD Measurement:

X-Ray diffraction measurements were done by using the powder X-ray diffraction measurement instrument X'pert PRO MPD (XRD; manufactured by Panalytical Business Unit of Spectris Co., Ltd.). The measurement conditions were as following: the Cu anticathode was used with the tube voltage of 45 kV, the tube current of 40 mA, and the scanning rate of 1.6°/minute. In addition, the analysis was made by using the High Score Plus software. The Pseudo Voiget function was used in the Rietvelt analysis and the Williamson-Hall method; and the calculation was made by adding the asymmetric character.

Measurement of pH:

Measurement of pH was done by using a pH test paper or a pH meter Type D-51 (manufactured by Horiba, Ltd.).

DSC Measurement:

In measurement of the differential scanning calorimeter (DSC), the differential scanning calorimeter DSC-60 (manufactured by Shimadzu Corp.) was used. The aluminum crimp cell ($\phi$5.8 mm×t 1.5 mm) was used as the sample cell, α-alumina was used as the reference sample, and 5 mg of the silver-copper alloy particles was used as the measurement sample. The measurement conditions were as following: the $N_2$ flow rate of 30 mL/minutes, the temperature range from room temperature to 400° C., and the temperature ascending rate of 20° C./minute.

Simultaneous Measurements of TG-DTA:

For the simultaneous measurements of differential thermal analysis-thermal gravity measurements (TG-DTA), the high temperature-type simultaneous differential thermal analysis-thermal gravity measurement instrument TG/DTA 6300 (manufactured by Seiko Instrument Inc.) was used. The measurement conditions were as following: 5.5 mg of α-alumina powders was used as the reference sample under the nitrogen atmosphere with the temperature range from 30 to 500° C. and with the temperature ascending rate of 30° C./minute.

As Examples 1 to 15, while the fluid which contained a silver ion and a copper ion or the fluid which contained a reducing agent was introduced as the first fluid from the center with the supply pressure of 0.50 MPaG, of the fluid which contained a silver ion and a copper ion or the fluid which contained a reducing agent, the fluid which was different from the first fluid was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the silver-copper alloy particles was discharged from between the processing surfaces 1 and 2. The discharged dispersion solution of the silver-copper alloy particles was treated by a centrifugal separator (20,000 G) to spin down the silver-copper alloy particles. After the supernatant solution thereof was removed, washing by methanol was repeated for three times; and then, the wet cake thus obtained was dried under air pressure at 25° C. to obtain dry powders of the silver-copper alloy particles. Confirmation of the particle diameter of the silver-copper alloy particles was done by using the TEM observation; and judgment thereof was done by the particle diameter of the primary particle thereof. The TEM measurements were done with the magnification of 250,000 or more; and the maximum value and the minimum value of 3 spots were used. Processing conditions of the first fluid are shown in Table 1; processing conditions of the second fluid are shown in Table 2; and shown in Table 3 are the rotation number of the processing surface 1, pH of the dispersion solution of the silver-copper alloy particles discharged from between the processing surfaces 1 and 2 (discharged solution), the ratio of silver to copper (mole ratio) in the silver-copper alloy particles obtained by the STEM-EDS and the TEM-EDS analyses results, whether or not there was the analysis point (in Table 3, they are referred to as measurement point) at which only silver (100% silver) or only copper (100% copper) was detected, the ratio of silver to copper (mole ratio) in the silver-copper alloy particles based on the ICP analysis results which was done by using the dried powders of the silver-copper alloy particles, and concentration of the copper (% by weight) contained in the silver-copper alloy particles. The abbreviations used in Table 1 and Table 2 are as following: EG; ethylene glycol, Toluene; toluene, $AgNO_3$; silver nitrate, $CH_3COOAg$; silver acetate, $Cu(NO_3)_2.3H_2O$; cupric nitrate trihydrate, $Cu(COOCH_3)_2.H_2O$; cupric acetate monohydrate, $Cu(COOCH_3)_2$; anhydrous cupric acetate, HMH; hydrazine monohydrate, DMAE; dimethylamino ethanol, PH; phenyl hydrazine, PVP; polyvinyl pyrrolidone, OA; n-octylamine, KOH; potassium hydroxide, $NaBH_4$; sodium borohydride, MeOH; methanol, EtOH; ethanol, SK08; Thiokalcol (surfactant, manufactured by Kao Corp.), and PW; pure water. Meanwhile, "Measurement point where 1.00% of Ag or of Cu was detected" shown in Table 3 includes, in addition to the analysis point at which only silver (100% silver) or only copper (100% copper) was detected, the analysis point at which the ratio of silver to copper (mole ratio) was in the α solid phase or the β solid phase. In addition, pH of the dispersion solutions of the silver-copper alloy particles (discharged solution) in Example 13 and Example 15 were measured after the dispersion solutions of the silver-copper alloy solution discharged from between the processing surfaces 1 and 2 were diluted by water by a factor of 10.

Comparative Examples 1 to 3 were carried out in the way similar to Examples 1 to 15.

Meanwhile, in Examples 1 to 12 and 16 and Comparative Examples 1 to 4, all data of Examples described in the specification of the application with the priority claim were thoroughly reviewed, and the data of Examples after reviewed are described herein.

The TEM-EDS analysis and the STEM-EDS analysis were carried out at all analysis points; and as a result, in the silver-copper alloy particles obtained in Examples, it was confirmed that copper concentrations contained in the silver-copper alloy were in the range of 0.1 to 99.94% by weight, that is, the silver-copper alloy particles were in the solid phase α+β region in the phase equilibrium diagram of the Ag—Cu alloy. In addition, there was no analysis point detected at which the ratio of silver to copper (mole ratio) in the silver-copper alloy particles obtained in Examples was the ratio of silver to copper (mole ratio) in the solid phase α or the solid phase β in the phase equilibrium diagram of the Ag—Cu alloy, nor was detected the analysis point at which silver was 100% or copper was 100%.

Figure 11:
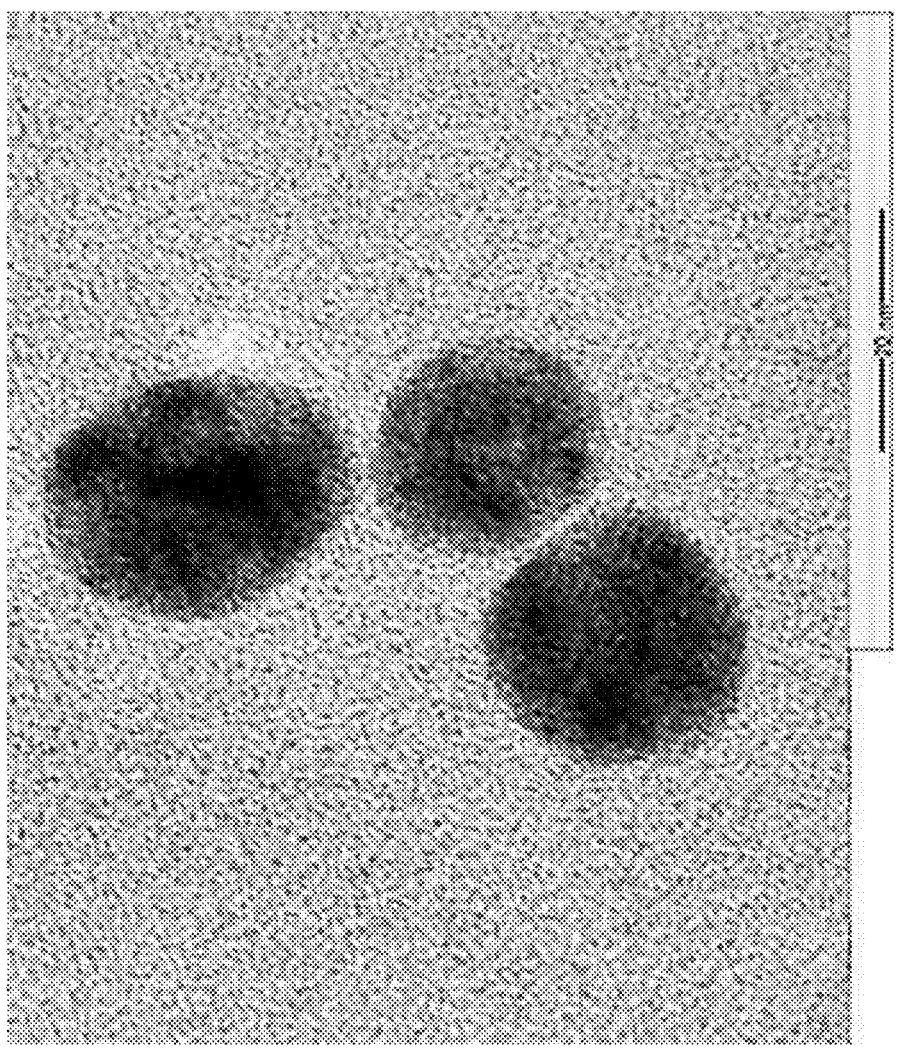
FIG. 11: This shows the TEM picture of the silver-copper alloy particle prepared in Example 6.
Figure 15:
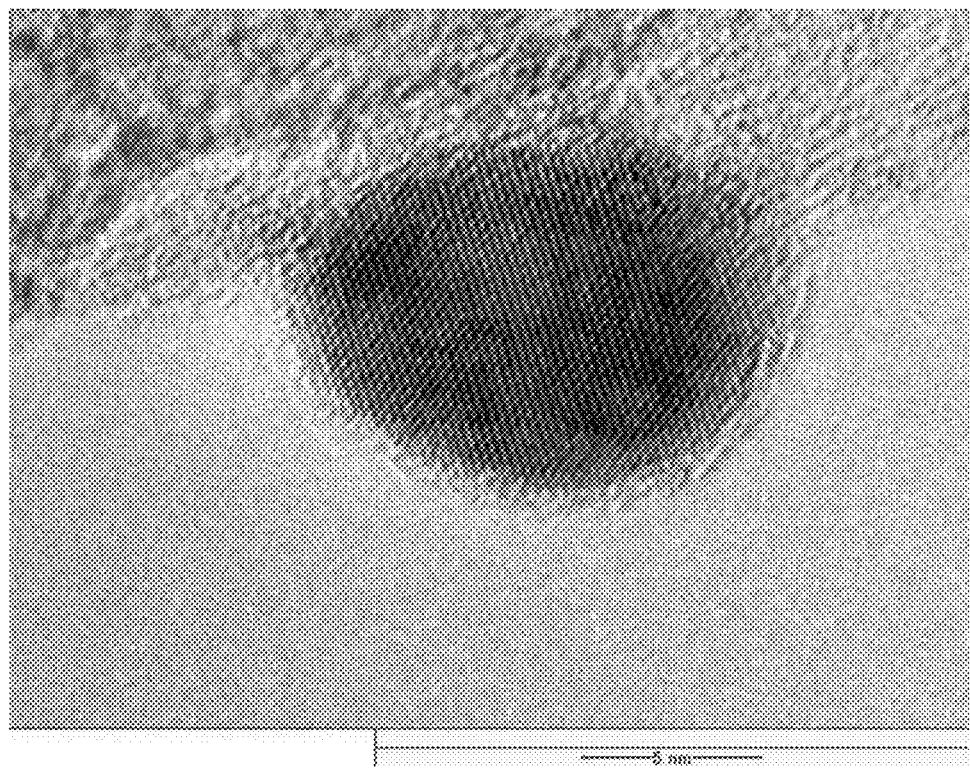
FIG. 15: This shows the TEM picture of the silver-copper alloy particle prepared in Example 7.
Figure 16:
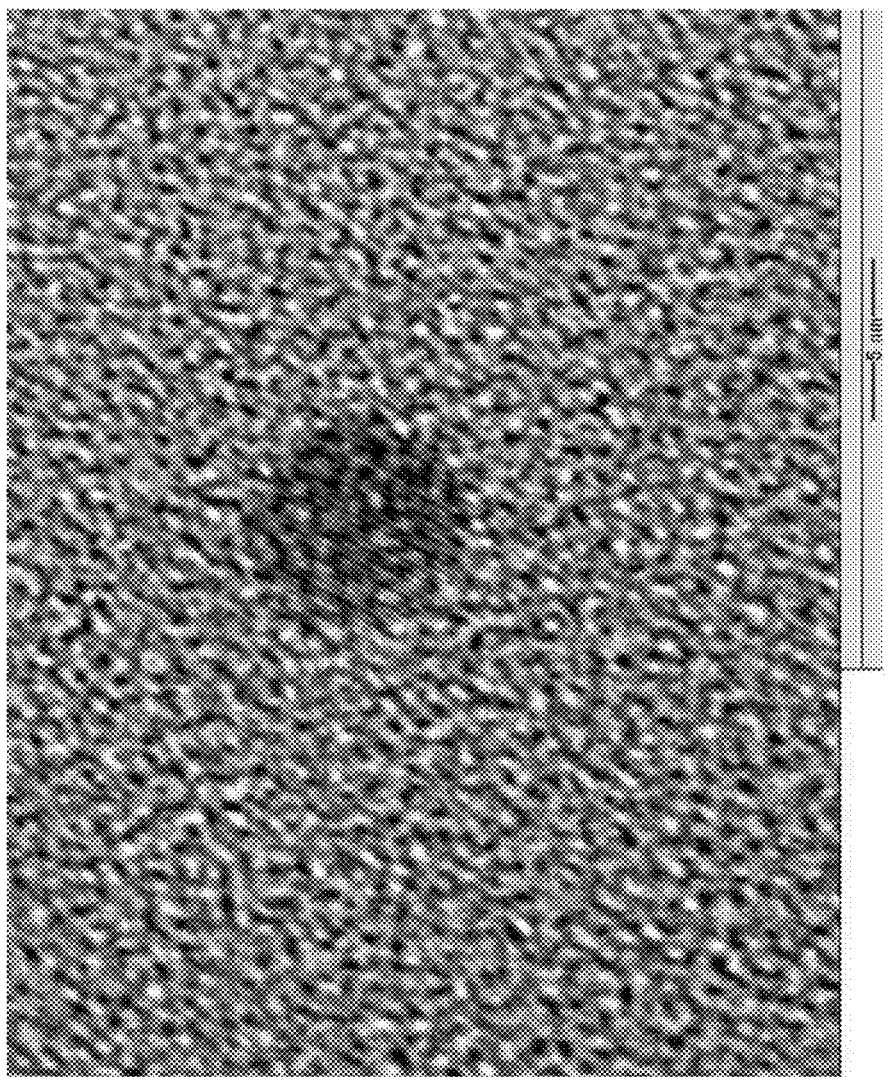
FIG. 16: This shows the TEM picture of the silver-copper alloy particle prepared in Example 3.
Figure 17:
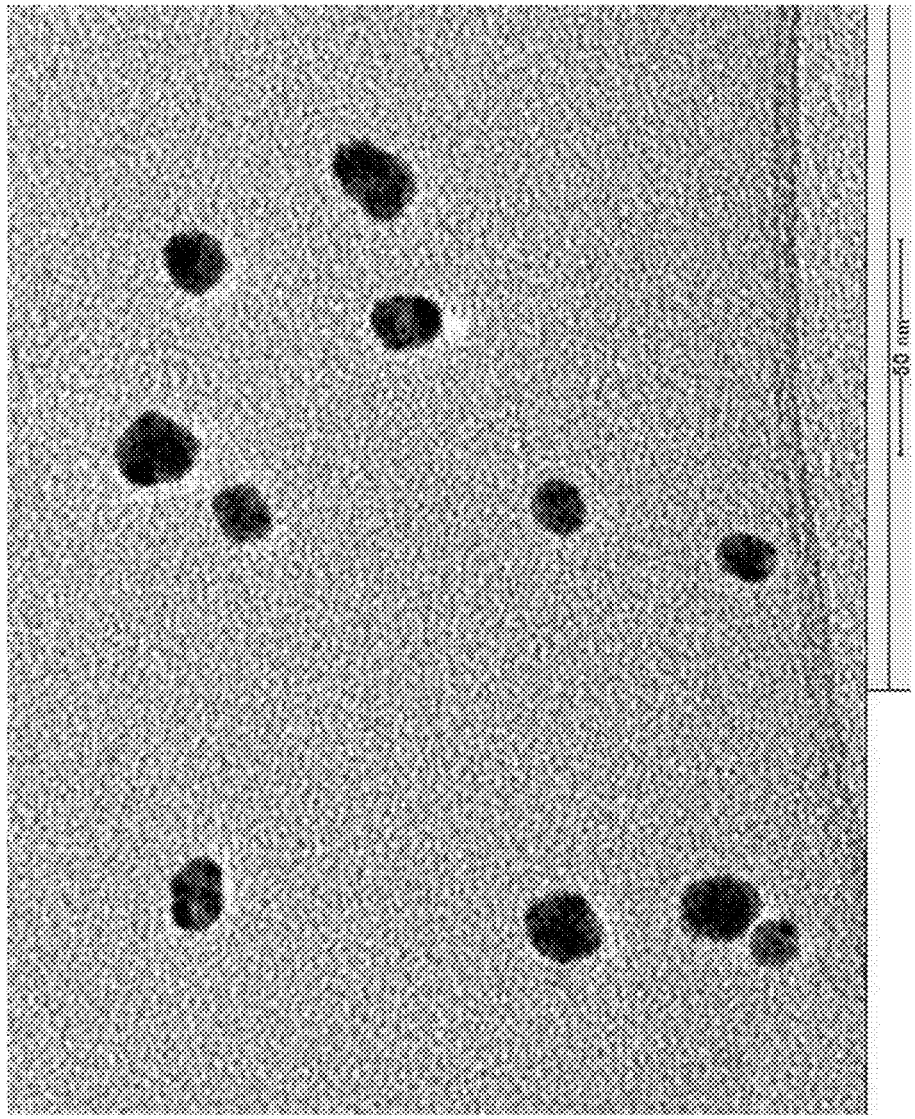
FIG. 17: This shows the low magnification TEM picture of the silver-copper alloy particle prepared in Example 4.

In FIG. 4, (A) the STEM-HAADF picture and the EDS mapping results ((B): Ag, and (C): Cu) of the silver-copper alloy particles obtained in Example 2 are shown; in FIG. 5, (A) the STEM-HAADF picture and the EDS mapping results ((B): Ag, and (C): Cu) of the silver-copper alloy particles obtained in Example 4 are shown; and in FIG. 6, (A) the STEM-HAADF picture and the EDS mapping results ((B): Ag, and (C): Cu) of the silver-copper alloy particles obtained in Example 8 are shown. In FIG. 8, the HRTEM picture and the STEM-EDS analysis points (4 points) of the silver-copper alloy particle obtained in Example 8 are shown; and in FIG. 9, the STEM-EDS analysis results measured at each of the analysis points shown in FIG. 8 are shown. In FIG. 12, the HRTEM picture and the TEM-EDS analysis points (5 points) of the silver-copper alloy particle obtained in Example 10 are shown; and in FIG. 13, the TEM-EDS analysis results measured at each of the analysis points shown in FIG. 12 are shown. In FIG. 10, the TEM picture of the silver-copper alloy particle obtained in Example 10 is shown; in FIG. 11, the TEM picture of the silver-copper alloy particles obtained in Example 6 is shown; in FIG. 15, the TEM picture of the silver-copper alloy particle obtained in Example 7 is shown: in FIG. 16, the TEM picture of the silver-copper alloy particle obtained in Example 3 is shown; and in FIG. 17, the low magnification TEM picture of the silver-copper alloy particles obtained in Example 4 is shown.

Figure 9:
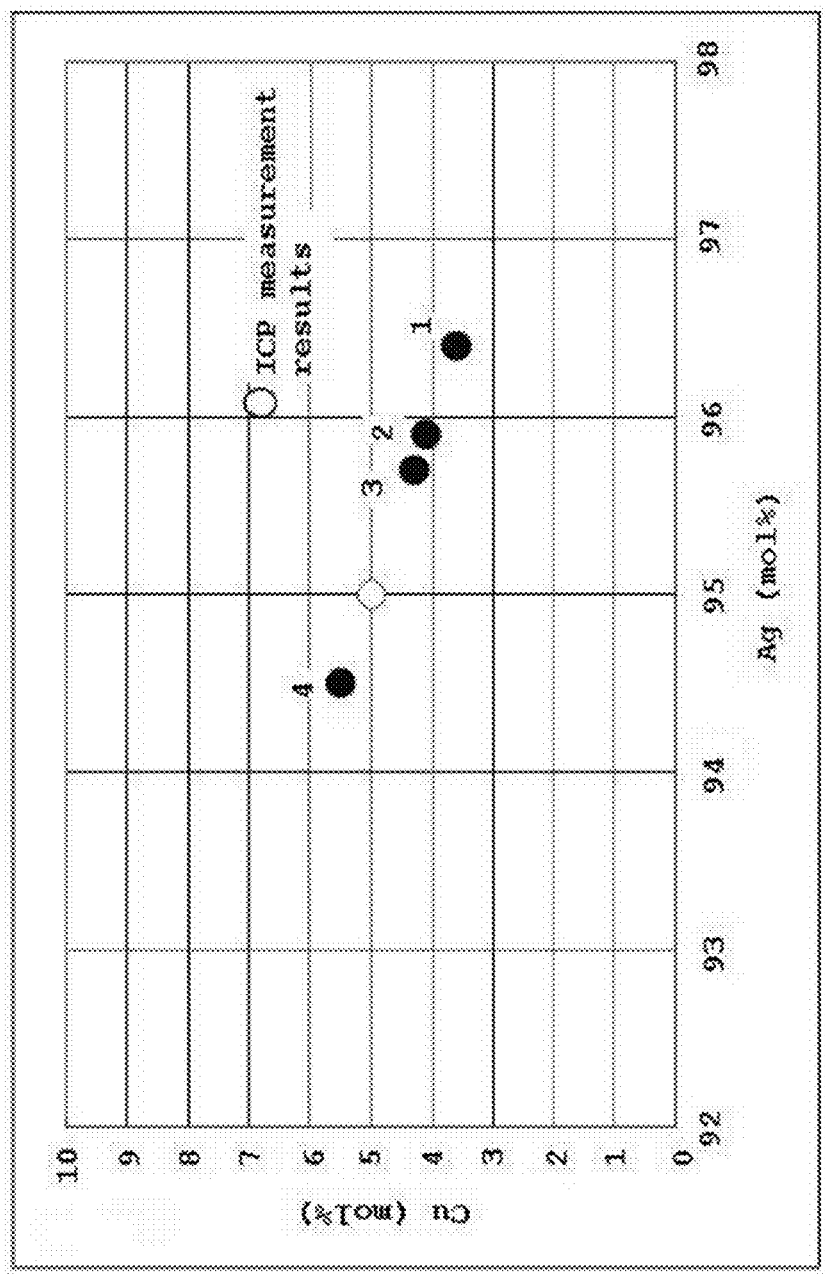
FIG. 9: This shows the STEM-EDS analysis results measured at each of the STEM-EDS analysis points shown in FIG. 8 of the silver-copper alloy particle prepared in Example 8.

The STEM-EDS analysis results in FIG. 9 are one example of the silver-copper alloy particles obtained in Example 8; and it was found that in each of 10 silver-copper alloy particles whose EDS analyses were conducted, in 50% or more points of the 4 analysis points, the mole ratios of silver to copper in the STEM-EDS analysis were detected within ±30% of the mole ratios of silver to copper obtained by the ICP analysis. In addition, as the results of the similar STEM-EDS analyses in other Examples shown in Table 3, the analysis points at which the mole ratios of the silver to copper in the STEM-EDS analysis in some analysis points were maximum±30% relative to the mole ratios of silver to copper obtained by the ICP analysis of each Example were present. Further, in the analysis using the EDS mapping, there were no such phenomenon that silver and copper were clearly segregated when observed at each analysis point.

The EDS analysis results in FIG. 13 are one example of the silver-copper alloy particles obtained in Example 10; and it was found that in each of 10 silver-copper alloy particles whose TEM-EDS analyses were conducted, in 50% or more points of the 5 analysis points, the mole ratios of the silver to copper in the TEM-EDS analysis were detected within ±30% of the mole ratios of the silver to copper obtained by the ICP analysis. In addition, as the results of the similar TEM-EDS analyses in other Examples shown in Table 3, the analysis points at which the mole ratios of the silver to copper in the TEM-EDS analysis in some analysis points were maximum±30% relative to the mole ratios of silver to copper obtained by the ICP analysis of each Example were present.

Figure 14:
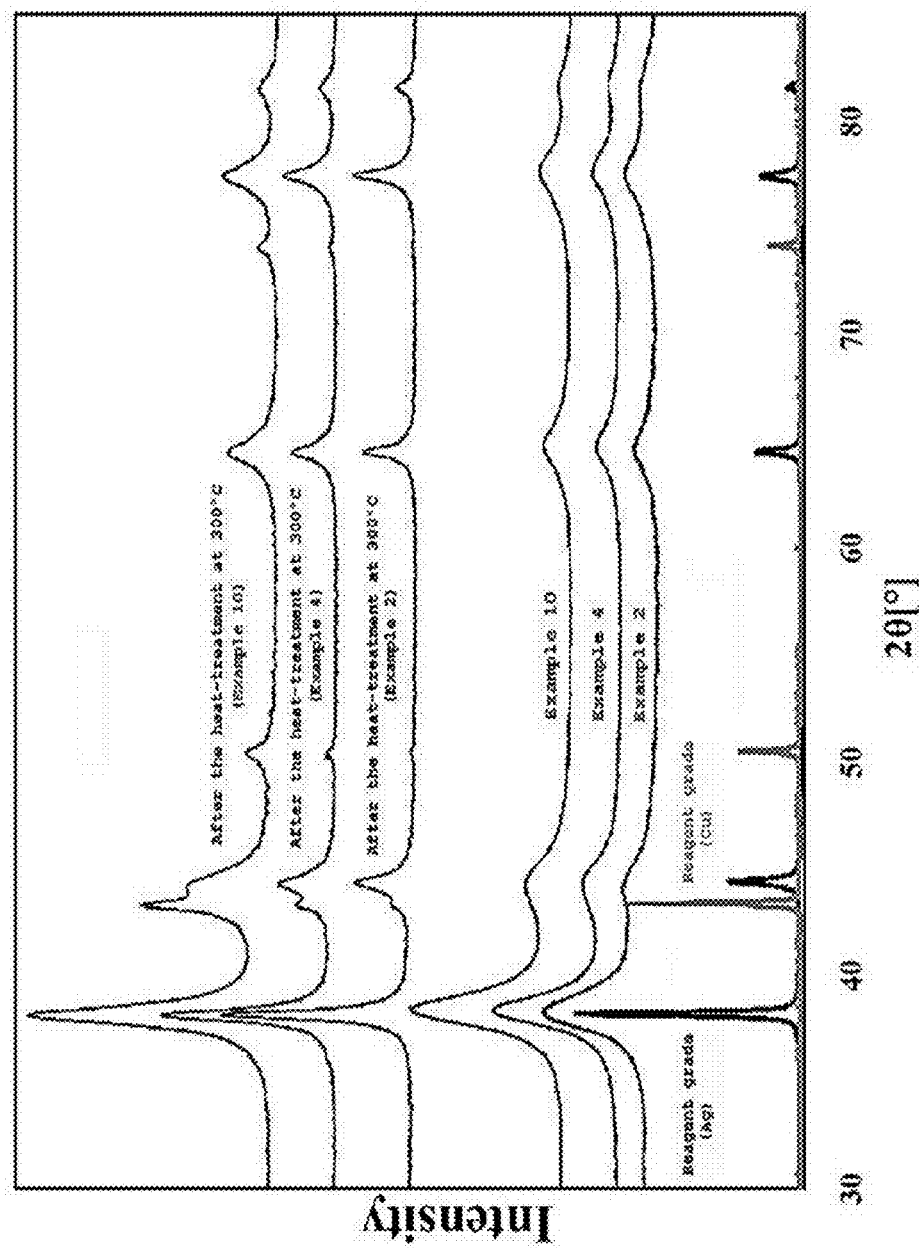
FIG. 14: This shows the XRD measurement results by using the dry powders of the silver-copper alloy particles prepared in Examples 2, 4, and 10, and the XRD measurement results by using the heat-treated powders obtained by heat-treating the said dry powders of the silver-copper alloy particles, wherein the heat-treatment was done at 300° C. for 30 minutes.

In FIG. 14, the XRD measurement results by using the dried powders of the silver-copper alloy particles prepared in Examples 2, 4, and 10, as well as the XRD measurement results by using the heat-treated powders obtained by heat-treating the said silver-copper alloy particles at 300° C. for 30 minutes are shown. The respective dried powders of the silver-copper alloy particles prepared in Examples 2, 4, and 10 were heat-treated at 300° C. for 30 minutes to obtain the respective heat-treated powders. Hereunder, the dried powders of the silver-copper alloy particles obtained in Examples are described as "silver-copper alloy particles before the heat treatment (or untreated)", and the dried powders of the silver-copper alloy particle obtained in Examples which are heat-treated by the afore-mentioned condition are described as "silver-copper alloy particles after the heat treatment". For comparison purpose, as the reference sample, the diffraction patterns of the reagent grade Ag and Cu are shown as well. It can be seen that the diffraction peaks of the silver-copper alloy particles before the heat treatment are wider. In addition, it can be seen that all of the silver-copper alloy particles before the heat treatment show the diffraction peaks near to the peaks of Ag used as the reference sample. From the diffraction pattern, it is thought that the silver-copper alloy particle before the heat treatment has the mother structure form of Ag having the FCC structure. It was confirmed that in the peak appearing at near 38.2°, which is attributable to [111] of Ag having the FCC structure, the peak of the silver-copper alloy particle before the heat treatment shifted slightly toward the higher angle side as the ratio of Cu in the silver-copper alloy particle increased. In addition, each diffraction peak of the silver-copper alloy particles became sharper after the heat treatment, and included the diffraction peaks of Cu having the FCC structure, thereby appearing that respective diffractive patterns were separated as if they were the mixtures of Cu and Ag. The peaks of the silver-copper alloy particles after the heat treatment which coincide with the peaks of Cu increased their relative strengths as the ratio of Cu in the silver-copper alloy increased (in the order from Example 2 to Example 4 and then to Example 10).

The lattice parameters, the crystallite sizes, and the strains obtained by using the Rietvelt analysis and the Williamson-Hall method based on the XRD measurement results shown in FIG. 14 are shown in Table 4. With regard to the silver-copper alloy particles after the heat treatment, the analyses were made as two phases of Ag and Cu. With regard to the silver-copper alloy particles before the heat treatment, all the lattice parameters are larger than the lattice parameter 4.086 (Å) of Ag (Reference No. 1: R. K. Linde, in Partial Fulfillment of the Requirements for the Degree of Doctor of Philosophy, California Institute of Technology, 1964). In addition, it can be seen that the crystallite sizes of the silver-copper alloy particles before the heat treatment obtained by the afore-mentioned methods are about 5 to 6 nm, and that they are strained. One reason for spreading of the lattice parameters may be attributed to, in addition to the effects of the crystallite size and of the strain, the composite effects due to random distribution of Ag and Cu inside the particle.

Figure 18:
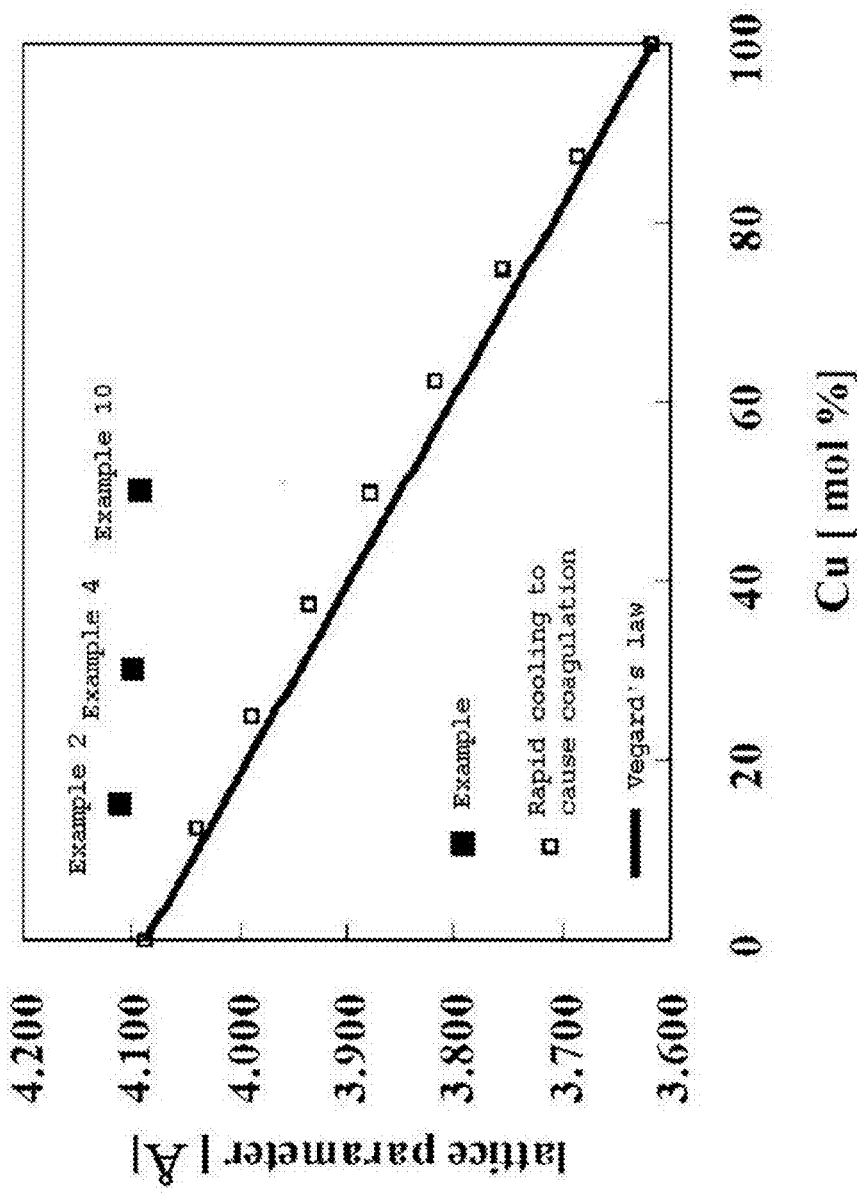
FIG. 18: This shows the lattice parameters of the silver-copper alloy particles prepared in Examples 2, 4, and 10, the lattice parameters of the AgCu solid solution obtained from the Vegard law, and change of the lattice parameters relative to the Cu ratios of the AgCu solid solutions obtained by rapid cooling to cause coagulation.

With regard to the change in lattice parameter, in FIG. 18 the lattice parameters of the silver-copper alloy particles before the heat treatment in Examples 2, 4, and 10 are shown in the graph showing the lattice parameters of the AgCu solid solutions obtained from the Vegard law shown in Reference No. 1 and the lattice parameters of the AgCu solid solutions obtained by rapid cooling to cause coagulation. It can be seen that in the silver-copper alloy particles before the heat treatment, too, as the Cu ratio in the silver-copper alloy particles increases, the lattice parameter thereof tends to decrease.

The lattice parameters of the silver-copper alloy particles after the heat treatment were almost the same as the lattice parameters of Ag and Cu (3.615 (Å), Reference No. 1) as shown in Table 4.

Figure 19:
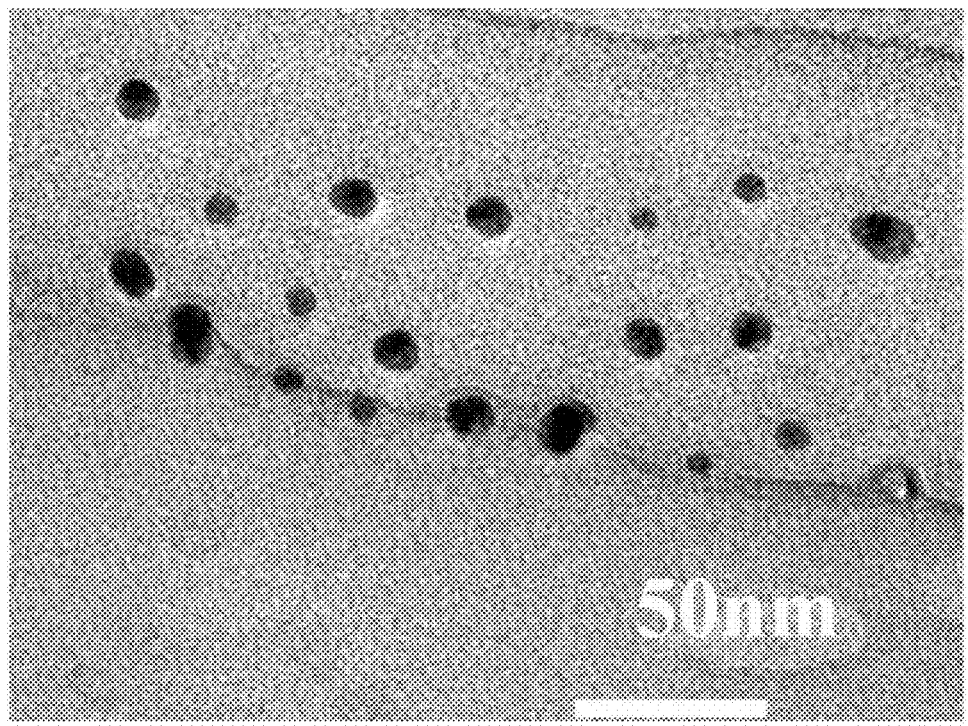
FIG. 19: This shows the TEM picture of the silver-copper alloy particle after heat-treatment of the dry powders of the silver-copper alloy particles prepared in Example 10, wherein the heat-treatment was done at 300° C. for 30 minutes.
Figure 20:
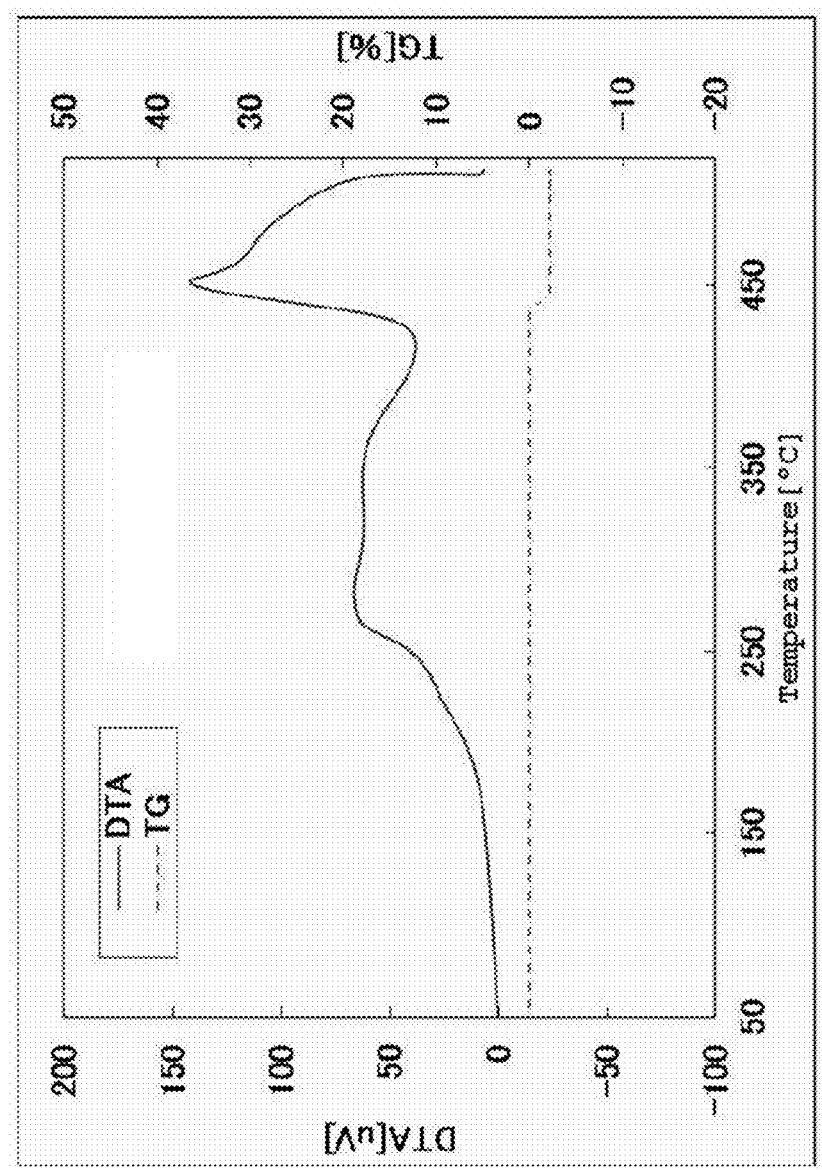
FIG. 20: This shows the TG-DTA measurement results of the silver-copper alloy particles prepared in Example 2, wherein the measurement was done under the nitrogen atmosphere.

The quantitative analyses results of silver and copper in the silver-copper alloy particles after the heat treatment obtained by the above-mentioned XRD measurement results are shown in Table 5. Approximately the same Ag:Cu mole ratio values as those in the silver-copper alloy particles before the heat treatment were obtained. In FIG. 19, the TEM picture of the silver-copper alloy particles after the heat treatment in Example 10 is shown as the representative thereof. As can be seen clearly in this picture, the particle diameters of the particles were about in the range of 10 to 20 nm even after the heat treatment; and thus, there was no change in particle diameters of the silver-copper alloy particles before and after the heat treatment. In addition, the quantitative analyses of the silver-copper alloy particles after the heat treatment were carried out in the way similar to those in the silver-copper alloy particles before the heat treatment by using the TEM-EDS analysis; and it was confirmed that the Ag:Cu ratio of the silver-copper alloy particles did not change before and after the heat treatment. Further, in FIG. 20, the TG-DTA measurement results of the silver-copper alloy particles obtained in Example 2, wherein the measurement was done under the nitrogen atmosphere, are shown. From FIG. 20, it was confirmed that there was no change in the weight of the silver-copper alloy particles by the heat treatment up to 300° C. The weight loss and the heat generation from around 450° C. to 500° C. in this graph can be attributable to PVP. Therefore, in the silver-copper alloy particles after the heat treatment, it is thought that there occurred the phase separation of Ag and Cu in the same particle, namely, the eutectic or single bodies of silver and of copper were clearly generated. In other words, it can be seen that the silver-copper alloy particles before the heat treatment are the solid solutions not containing the eutectic.

Figure 21:
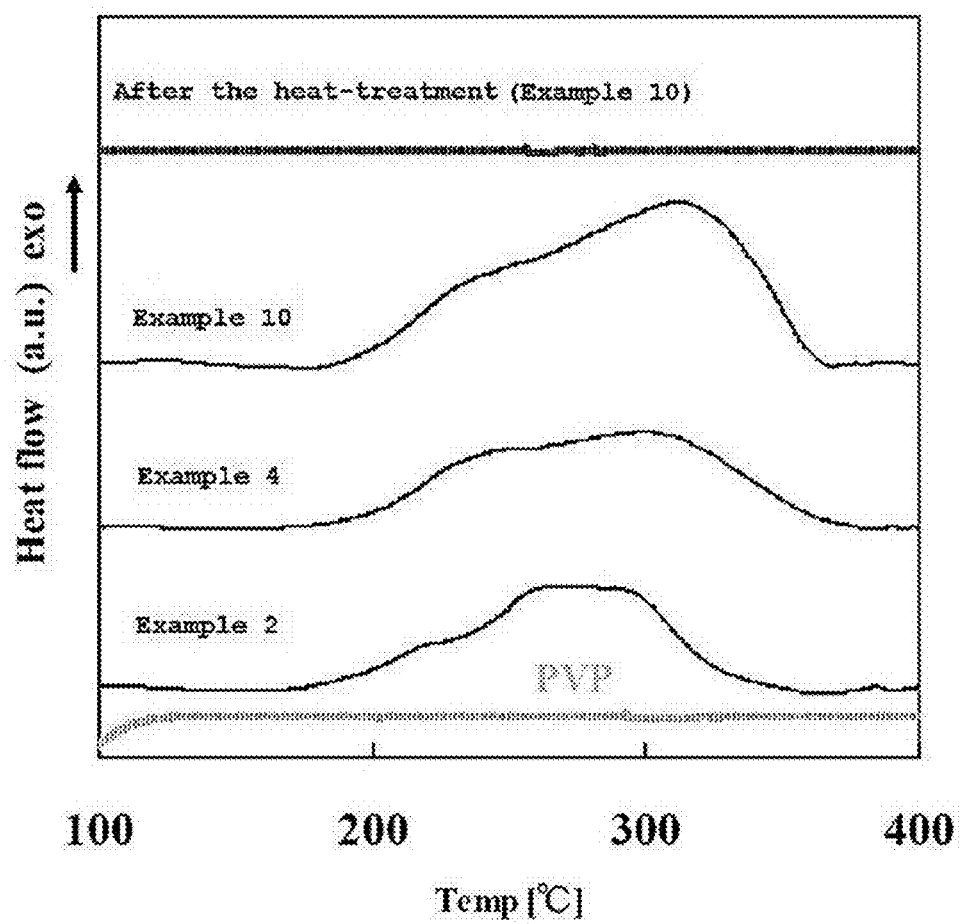
FIG. 21 This shows the DSC measurement results by using the dry powders of the silver-copper alloy particles prepared in Examples 2, 4, and 10, and by using the silver-copper alloy particles after heat-treatment of the dry powders of the silver-copper alloy particles prepared in Example 10, wherein the heat-treatment was done at 300° C. for 30 minutes.

In FIG. 21, shown therein are the DSC measurement results by using the dry powders of the silver-copper alloy particles obtained in Examples 2, 4, and 10, and by using the silver-copper alloy particles after heat treatment of the dry powders of the silver-copper alloy particles obtained in Example 10, wherein the heat treatment was done at 300° C. for 30 minutes. Because there might be a protective film formed by PVP that was contained in the first fluid or the second fluid, the DSC measurement result of PVP is also included in the DSC measurement results. In the measurement range, no specific peak attributable to PVP was confirmed. In the silver-copper alloy particles obtained by these Examples, very broad exothermic peaks were confirmed around in the range of 180 to 350° C. It is thought that this is attributable to decomposition and growth of the Ag—Cu terminal of the solid solution thereof (Reference No. 2: H. W. Sheng, G. Wilde, and E. Ma, Acta. Materialia, 50, 475 (2002); and Reference No. 3: Klassen T., Herr U., and Averback R. S., Acta. Mater., 49, 453 (1997)). In the DSC measurement result of the silver-copper alloy particles after the heat treatment in Example 10, no specific peak can be seen, suggesting that there occurred the irreversible change. In addition, as shown in Table 4, the crystal sizes of the silver-copper alloy particles after the heat treatment obtained by the XRD measurements became larger in any of silver and copper or both; and in addition, it can be seen that the strains thereof became smaller. Accordingly, it is thought that by the heat treatment at 300° C. for 30 minutes, the solid solution phase to constitute the silver-copper alloy particles before the heat treatment was decomposed so that the eutectic or the single bodies of silver and copper were generated while Ag and Cu grew respectively.

Figure 22:
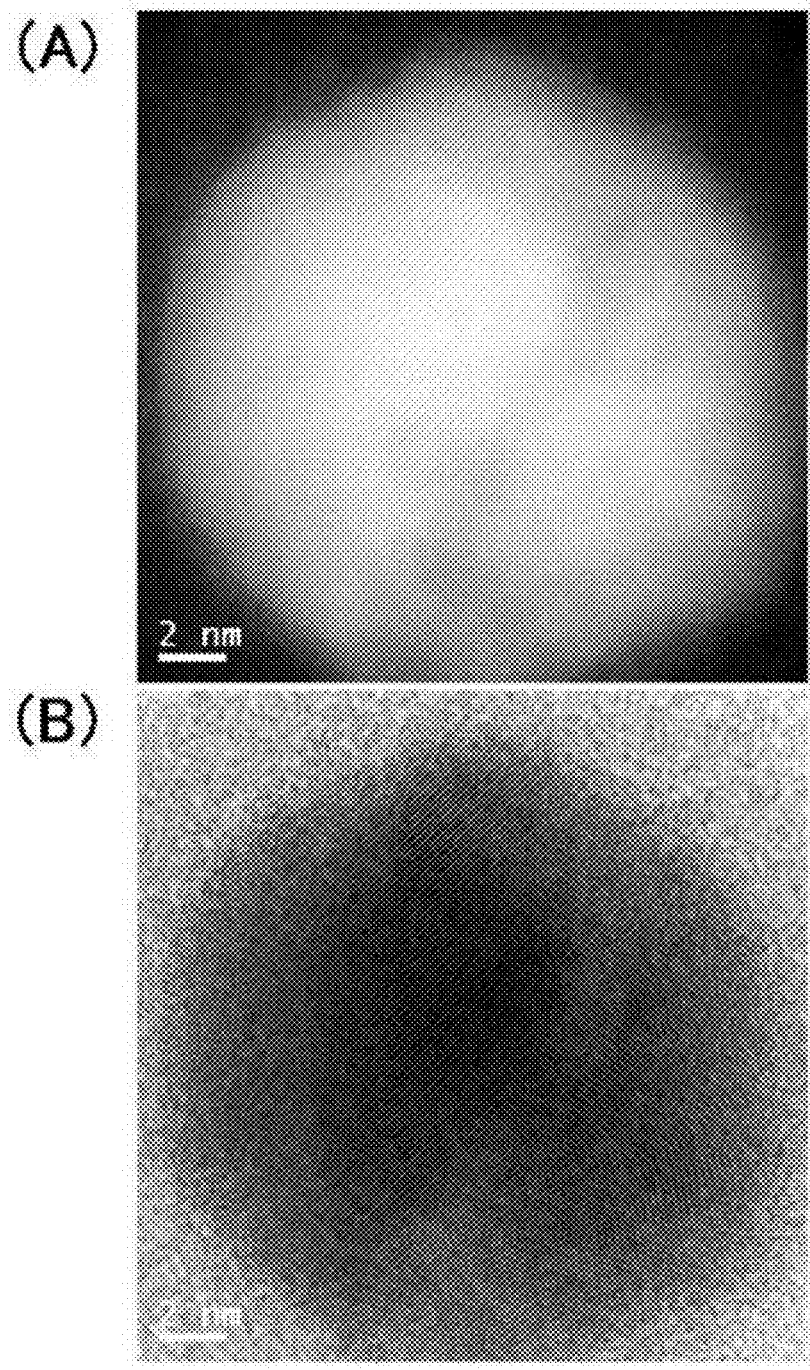
FIG. 22: This shows (A) the STEM-HAADF picture and (B) the STEM-BF (bright view) picture of the silver-copper alloy particle prepared in Example 13 (magnification of 10 million in both (A) and (B)).
Figure 23:
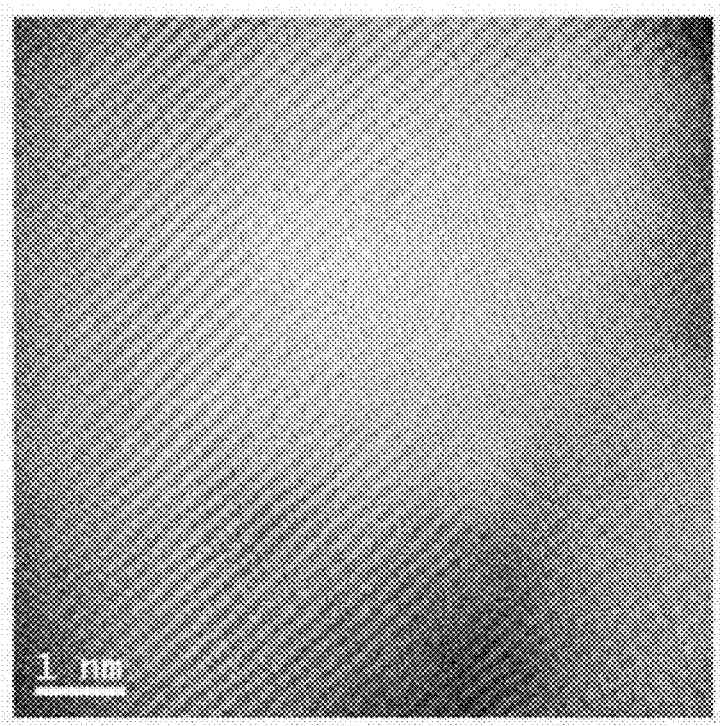
FIG. 23: This shows (A) the STEM-HAADF picture and (B) the STEM-BF (bright view) picture of the silver-copper alloy particle prepared in Example 13 (magnification of 20 million in both (A) and (B)).
Figure 23:
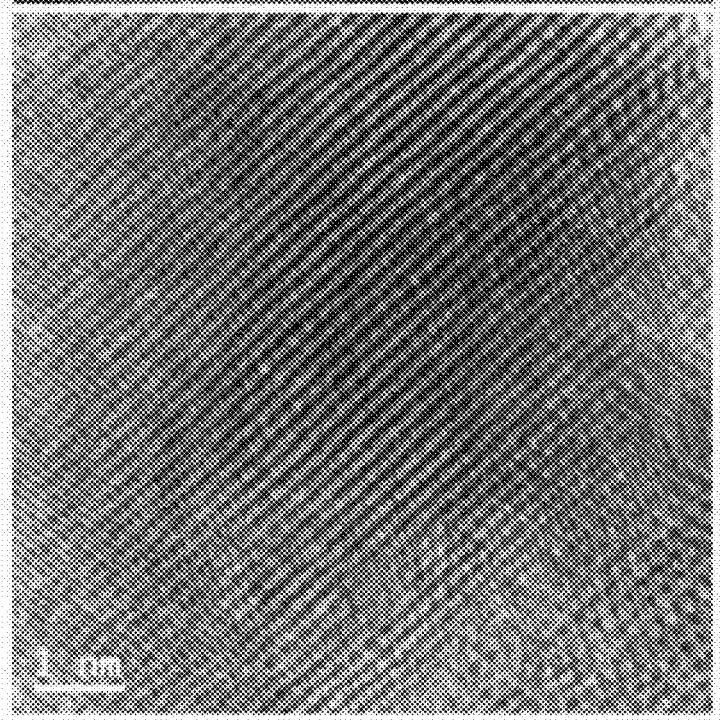
Figure 24:
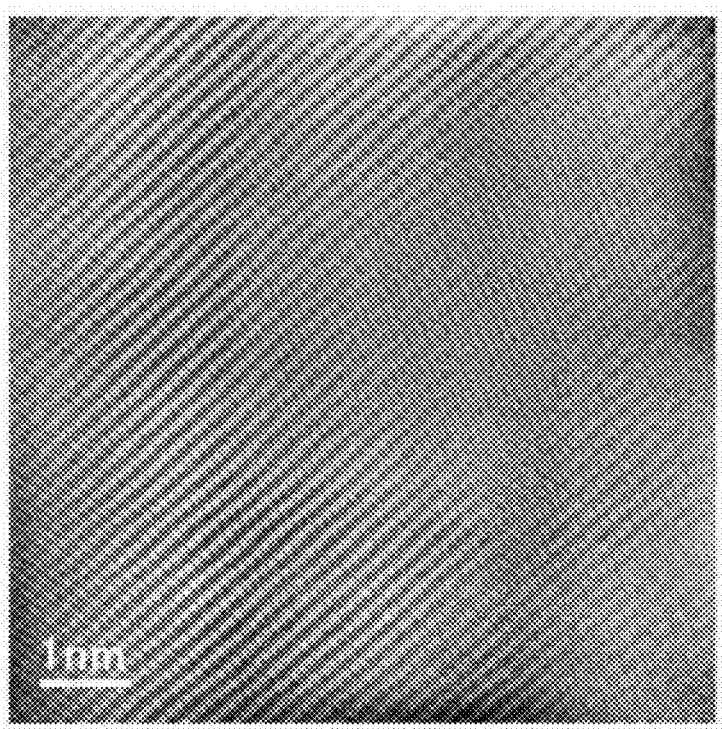
FIG. 24: This shows (A) the STEM-HAADF picture and (B) the STEM-BF (bright view) picture of the silver-copper alloy particle prepared in Example 13 (magnification of 20 million in both (A) and (B)), wherein these pictures were treated by the radial difference filter in the same viewing fields of the respective pictures of FIGS. 23 (A) and (B).
Figure 24:
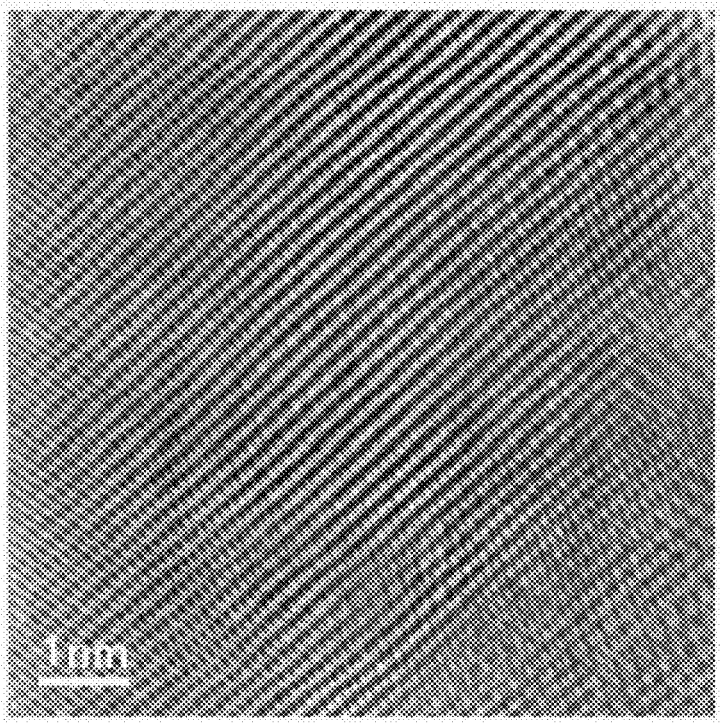

Next, in FIG. 22, the STEM pictures of the silver-copper alloy particle obtained in Example 13 ((A) the HAADF picture, and (B) the BF picture (bright view)) (magnification of 10 million) are shown. As shown in FIG. 22 (A) and (B), the lattice fringes were observed in the silver-copper alloy particle. In FIG. 23, the STEM pictures of the silver-copper alloy particle obtained in Example 13 ((A) the HAADF picture, and (B) the BF picture (bright view)) (magnification of 2000) are shown. In FIG. 24, the STEM pictures of the silver-copper alloy particle ((A) the HAADF picture, and (B) the BF picture (bright view)) (magnification of 20 million), wherein these pictures were treated by the radial difference filter in the same viewing fields of the respective pictures of FIG. 23 (A) and (B) to remove the effect of the collodion film on which the silver-copper alloy particles were mounted, are shown. In all the pictures shown in FIG. 23(A) and (B) and FIG. 24(A) and (B), the surged lattice fringes were confirmed.

Figure 25:
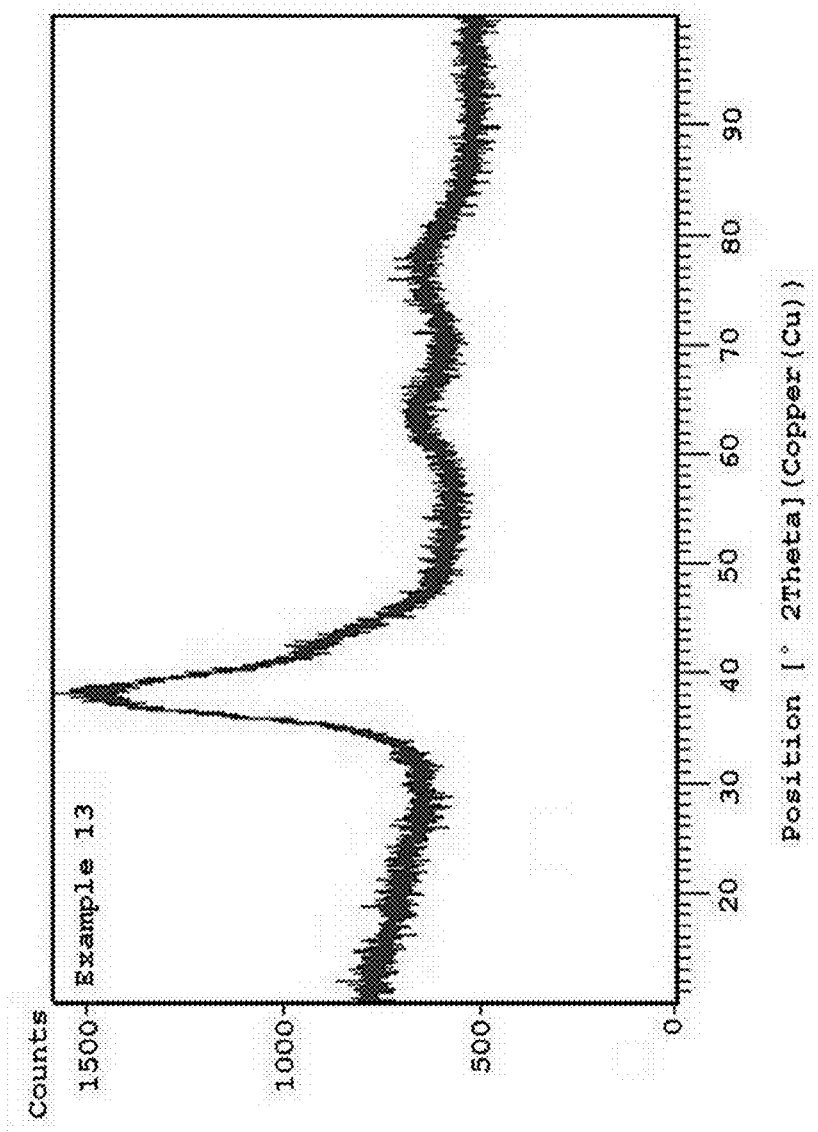
FIG. 25: This shows the XRD measurement result by using the dry powders of the silver-copper alloy particles prepared in Example 13.

In the case that each of silver and copper forms the crystallite of its own, there appear surges occasionally due to inconsistency in the grain boundary of these crystallites; however, the surges that were observed in the silver-copper alloy particles of Example 13 were observed inside the crystallite; and thus, it is thought that as silver and copper formed the solid solution, the surges were generated by strain of the crystal lattice due to the difference of the atomic radius between them. In addition, according to the results of the powder X-ray diffractometry measurement of the silver-copper alloy particles of Example 13 shown in FIG. 25, only the diffraction pattern near to the FCC silver was confirmed while the crystalline diffractions derived from copper were not observed; and thus, it is thought that the surges that were observed in the STEM pictures of FIG. 23 and FIG. 24 demonstrate that copper forms the solid solution in the FCC silver structure. In addition, the XRD measurement of the powders obtained by heat-treating the dried powders of the silver-copper particles of Example 13 at 300° C. for 30 minutes and the DSC measurements of the dried powders of the silver-copper particles of Example 13 and the powders obtained by heat-treating the said dried powders at 300° C. for 30 minutes showed the same results as those of Examples 2, 4, and 10; and the TG-DTA simultaneous measurements of the silver-copper alloy particles of Example 13 gave the same results as Example 2.

From the above results, it was found that the silver-copper alloy particles obtained in Examples 1 to 15 were the solid solution silver-copper alloy particles substantially not containing the eutectic.

TABLE 1

| | First fluid | | | | | | | | | |
|---|---|---|---|---|---|---|---|---|---|---|
| | Solvent | Mixed and dissolved substances | | | | | | | Supply temperature | pH (pH-test |
| | | 1 | | 2 | | 3 | | 4 | | |
| Example | Kind | (M) | Kind | (M) | Kind | (wt %) | Kind | (wt %) | Kind | (° C.) | paper) |
| 1 | EG | 0.00075 | $AgNO_3$ | 0.00425 | $Cu(NO_3)_2 \cdot 3H_2O$ | — | | — | | 160 | 4 to 5 |
| 2 | EG | 0.0043 | $AgNO_3$ | 0.00076 | $Cu(NO_3)_2 \cdot 3H_2O$ | — | | — | | 160 | 4 to 5 |
| 3 | EG | 0.44 | HMH | 0.063 | DMAE | 1 | PVP | 0.4 | KOH | 160 | 12 |
| 4 | EG | 0.0035 | $AgNO_3$ | 0.0015 | $Cu(NO_3)_2 \cdot 3H_2O$ | — | | — | | 160 | 4 to 5 |
| 5 | EG | 0.00182 | $AgNO_3$ | 0.00425 | $Cu(NO_3)_2 \cdot 3H_2O$ | — | | — | | 160 | 4 to 5 |
| 6 | EG | 0.007 | $AgNO_3$ | 0.063 | $Cu(NO_3)_2 \cdot 3H_2O$ | — | | — | | 160 | 4 to 5 |
| 7 | EG | 0.063 | $AgNO_3$ | 0.007 | $Cu(NO_3)_2 \cdot 3H_2O$ | — | | — | | 160 | 4 to 5 |
| 8 | EG | 0.00425 | $AgNO_3$ | 0.00022 | $Cu(NO_3)_2 \cdot 3H_2O$ | — | | — | | 160 | 4 to 5 |
| 9 | EG | 0.00425 | $AgNO_3$ | $8.52 \times 10^{-6}$ | $Cu(NO_3)_2 \cdot 3H_2O$ | — | | — | | 160 | 4 to 5 |
| 10 | EG | 0.0025 | $AgNO_3$ | 0.0025 | $Cu(NO_3)_2 \cdot 3H_2O$ | — | | — | | 160 | 4 to 5 |
| 11 | EG | 0.0043 | $AgNO_3$ | 0.00076 | $Cu(NO_3)_2 \cdot 3H_2O$ | — | | — | | 160 | 4 to 5 |
| 12 | EG | 0.063 | $AgNO_3$ | 0.007 | $Cu(NO_3)_2 \cdot 3H_2O$ | — | | — | | 160 | 4 to 5 |
| 13 | Toluene | 0.0025 | $CH_3COOAg$ | 0.0025 | $Cu(COOCH_3)_2$ | 0.005 | OA | — | | 24 | 4 to 5 |
| 14 | EG | 0.002 | $AgNO_3$ | 0.002 | $Cu(NO_3)_2 \cdot 3H_2O$ | — | | — | | 140 | 4 to 5 |
| 15 | Toluene | 0.002 | $CH_3COOAg$ | 0.005 | $Cu(COOCH_3)_2$ | 0.08 | OA | — | | 24 | — |
| Comparative Example 1 | MeOH | 0.1000 | $NaBH_4$ | 0.0033 | SK08 | — | | — | | 29 | 12 |
| Comparative Example 2 | EG | 0.00425 | $AgNO_3$ | 0.00022 | $Cu(NO_3)_2 \cdot 3H_2O$ | — | | — | | 160 | 4 to 5 |
| Comparative Example 3 | EG | 0.00425 | $AgNO_3$ | 0.00022 | $Cu(NO_3)_2 \cdot 3H_2O$ | — | | — | | 160 | 4 to 5 |

TABLE 2

| | Second fluid | | | | | | | | | | | |
|---|---|---|---|---|---|---|---|---|---|---|---|---|
| | Solvent | | | Mixed and dissolved substances | | | | | | | Supply temperature | pH (pH-test |
| | 1 | | 2 | 1 | | 2 | | 3 | | 4 | | |
| Example | Kind | (wt %) | Name | (M) | Kind | (M) | Kind | (wt %) | Kind | (wt %) | Kind | (° C.) | paper) |
| 1 | EG | 7 | PW | 0.56 | DMAE | 3.95 | HMH | 9.75 | PVP | 3 | KOH | 25 | >14 |
| 2 | EG | 7 | PW | 0.56 | DMAE | 3.95 | HMH | 9.75 | PVP | 3 | KOH | 25 | >14 |
| 3 | EG | — | — | 0.0425 | $AgNO_3$ | 0.0075 | $Cu(COOCH_3)_2 \cdot 3H_2O$ | — | | — | | 25 | 4 to 5 |
| 4 | EG | 7 | PW | 0.56 | DMAE | 3.95 | HMH | 9.75 | PVP | 3 | KOH | 25 | >14 |
| 5 | EG | 7 | PW | 0.56 | DMAE | 3.95 | HMH | 9.75 | PVP | 3 | KOH | 25 | >14 |
| 6 | EG | 7 | PW | 0.56 | DMAE | 3.95 | HMH | 9.75 | PVP | 3 | KOH | 25 | >14 |
| 7 | EG | 7 | PW | 0.56 | DMAE | 3.95 | HMH | 9.75 | PVP | 3 | KOH | 25 | >14 |
| 8 | EG | 7 | PW | 0.56 | DMAE | 3.95 | HMH | 9.75 | PVP | 3 | KOH | 25 | >14 |
| 9 | EG | 7 | PW | 0.56 | DMAE | 3.95 | HMH | 9.75 | PVP | 3 | KOH | 25 | >14 |
| 10 | EG | 7 | PW | 0.56 | DMAE | 3.95 | HMH | 9.75 | PVP | 3 | KOH | 25 | >14 |
| 11 | EG | 7 | PW | 0.315 | DMAE | 0.55 | HMH | 4.00 | PVP | | | 25 | 10 to 11 |
| 12 | EG | 7 | PW | 0.315 | DMAE | 0.55 | HMH | 4.00 | PVP | | | 25 | 10 to 11 |
| 13 | Toluene | 24 | EtOH | 0.98 | PH | 0.24 | KOH | — | | — | | 24 | >14 |
| 14 | EG | 3.5 | PW | 0.31 | OA | 0.55 | HMH | 45 | EtOH | 1.5 | KOH | 22 | >14 |
| 15 | Toluene | 18.1 | EtOH | 0.99 | PH | — | — | — | | 11.3 | 0.5N KOH in EtOH | 25 | >14 |
| Comparative Example 1 | MeOH | — | — | 1.9 | $AgNO_3$ | 0.3 | $Cu(NO_3)_2 \cdot 3H_2O$ | — | | — | | 26 | 4 to 5 |
| Comparative Example 2 | EG | 7 | PW | — | — | 4.51 | HMH | 9.75 | PVP | 3 | KOH | 25 | >14 |
| Comparative Example 3 | EG | 7 | PW | 4.51 | DMAE | — | — | — | | 3 | KOH | 25 | >14 |

TABLE 3

| | Processing surface Rotation number (rpm) | Discharged solution pH (pH meter) | EDS STEM-EDS Copper Mole ratio | EDS STEM-EDS Silver Mole ratio | EDS TEM-EDS Copper Mole ratio | EDS TEM-EDS Silver Mole ratio | Measurement point where 100% of Ag or of Cu was detected | ICP Copper Mole ratio | ICP Silver Mole ratio | Cu concentration in AgCu alloy (wt %) | Particle diameter (nm) |
|---|---|---|---|---|---|---|---|---|---|---|---|
| 1 | 1700 | 11.4 | 83.9 | 16.1 | 84.8 | 15.2 | No | 84.7 | 15.3 | 76.5 | 10 to 20 |
| 2 | 1700 | 11.1 | 15.2 | 84.8 | 14.9 | 85.1 | No | 14.5 | 85.5 | 9.1 | 10 to 20 |
| 3 | 1700 | 11.4 | 15.2 | 84.8 | 15.6 | 84.4 | No | 15.0 | 85.0 | 9.4 | 5 to 10 |
| 4 | 1700 | 11.5 | 30.9 | 69.1 | 30.0 | 70.0 | No | 30.1 | 69.9 | 20.2 | 10 to 20 |
| 5 | 1700 | 11.8 | 69.9 | 30.1 | 70.2 | 29.8 | No | 69.9 | 30.1 | 57.8 | 3 to 5 |
| 6 | 1700 | 10.2 | 89.6 | 10.4 | 90.3 | 9.7 | No | 90.1 | 9.9 | 84.3 | 20 to 45 |
| 7 | 1700 | 9.94 | 10.4 | 89.6 | 9.8 | 90.2 | No | 10.1 | 89.9 | 6.2 | 10 to 15 |
| 8 | 1700 | 11.9 | 5.3 | 94.7 | 5.1 | 94.9 | No | 5.0 | 95.0 | 3.0 | 5 to 10 |
| 9 | 1700 | 12.4 | 0.2 | 99.8 | 0.2 | 99.8 | No | 0.2 | 99.8 | 0.1 | 20 |
| 10 | 1700 | 11.7 | 47.6 | 52.4 | 49.1 | 50.9 | No | 49.7 | 50.3 | 36.8 | 10 to 20 |
| 11 | 1700 | 8.6 | 14.9 | 85.1 | 15.4 | 84.6 | No | 15.1 | 84.9 | 9.5 | 15 to 20 |
| 12 | 1700 | 7.4 | 7.2 | 92.8 | 8.9 | 91.1 | No | 10.2 | 89.8 | 6.3 | 20 to 30 |
| 13 | 1700 | 10.5 | 49.8 | 50.2 | 49.7 | 50.3 | No | 50.1 | 49.9 | 37.2 | 15 to 25 |
| 14 | 1700 | 11.2 | 50.3 | 49.7 | 50.1 | 49.9 | No | 49.7 | 50.3 | 36.8 | 10 |
| 15 | 1700 | 10.4 | 71.1 | 28.9 | 71.8 | 28.2 | No | 71.6 | 28.4 | 59.8 | 30 |
| Comparative Example 1 | 1700 | 12.0 | 54.4 | 45.6 | 67.4 | 32.6 | Yes | 10.2 | 89.8 | 6.3 | 10 to 20 |
| Comparative Example 2 | 1700 | 11.2 | 65.9 | 34.1 | 55.1 | 44.9 | Yes | 5.3 | 94.7 | 3.2 | 5 to 15 |
| Comparative Example 3 | 1700 | 10.8 | 38.2 | 61.8 | 54.6 | 45.4 | Yes | 4.9 | 95.1 | 2.9 | 15 to 30 |

TABLE 4

| | Lattice parameter | Lattice parameter Heat treatment at 300° C. | Lattice parameter Heat treatment at 300° C. | Crystallite size | Crystallite size Heat treatment at 300° C. | Crystallite size Heat treatment at 300° C. | Strain | Strain Heat treatment at 300° C. | Strain Heat treatment at 300° C. |
|---|---|---|---|---|---|---|---|---|---|
| Example | Untreated | Ag (Å) | Cu | Untreated | Ag (Å) | Cu | Untreated | Ag (%) | Cu |
| 2 | 4.122 | 4.083 | 3.620 | 61 | 217 | 44 | 2.1 | 0.5 | 0.6 |
| 4 | 4.101 | 4.084 | 3.618 | 56 | 134 | 137 | 1.1 | 0.6 | 0.7 |
| 6 | 4.094 | 4.084 | 3.618 | 54 | 94 | 145 | 1.1 | 0.8 | 0.7 |

TABLE 5

| Example | Ag (mol %) | Cu (mol %) |
|---|---|---|
| 2 | 85.8 | 14.2 |
| 4 | 70.5 | 29.5 |
| 10 | 50.9 | 49.1 |

Accordingly, it became clear that the silver-copper alloy according to the present invention is the silver-copper alloy substantially not containing the eutectic, and that the silver-copper alloy is the solid solution.

In addition, it became clear that the silver-copper alloy of the present invention could be produced by mixing the fluid which contained a silver ion and a copper ion with the fluid which contained a reducing agent in the thin film fluid formed between at least two processing surfaces which were disposed in a position they were faced with each other so as to be able to approach to and separate from each other, at least one of which rotated relative to the other, whereby separating the silver-copper alloy particles substantially not containing the eutectic.

At this occasion, it was confirmed that the silver-copper alloy particles substantially not containing the eutectic could be produced equally regardless of whether the fluid which contained one reducing agent was used or the fluid which contained two reducing agents was used as the fluid which contained the reducing agent. Although the mechanism how the silver-copper alloy particles substantially not containing the eutectic as mentioned above could be produced is not clear yet, it is thought that depending on the reducing agent and the kind and amount of the dispersant showing the reducing property, the effects of them to production of the silver-copper alloy particles are different.

In addition, it was found that to produce the silver-copper alloy particles substantially not containing the eutectic body, pH of the fluid after mixing of the fluid which contains a reducing agent with the fluid which contains a silver ion and a copper ion is preferably 7 or higher, or more preferably 8 or higher.

Production of Tin-silver-copper Alloy:

In Example 16, while the fluid which contained a silver ion, a copper ion, and a stannous (Sn) ion was introduced as the first fluid from the center with the supply pressure of 0.30 MPaG, the fluid which contained the reducing agent was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the tin-silver-copper alloy particles discharged from between the processing surfaces 1 and 2 was treated by a centrifugal separator (21,000 G) to spin down the tin-silver-copper alloy particles. After the supernatant solution thereof was removed, washing by methanol was repeated for three times; and then, the wet cake thus obtained was dried at −0.095 MPaG at 25° C. to obtain dry powders of the tin-silver-copper alloy particles. Confirmation of the particle diameter of the tin-silver-copper alloy particles was done by using the TEM observation; and judgment thereof was done by the particle diameter of the primary particles thereof. The TEM measurements were done with the magnification of 250,000 or more, or preferably 500,000 or more; and the maximum value and the minimum value of 3 spots were used. Processing conditions of the first fluid are shown in Table 6; processing conditions of the second fluid are shown in Table 7; and shown in Table 8 are the rotation number of the processing surface 1, pH of the dispersion solution of the tin-silver-copper alloy particles (discharged solution), the ratio of tin, silver, and copper (mole ratio) in the tin-silver-copper alloy particles obtained by the TEM-EDS analyses results, whether or not there was the analysis point (in Table 8, they are referred to as measurement point) at which only tin, only silver (100% silver), or only copper (100% copper) was detected by the TEM-EDS analyses, and the mole ratio of tin, silver, and copper in the tin-silver-copper alloy particles based on the ICP analysis results which was done by using the dried powders of the tin-silver-copper alloy particles. The abbreviations used in Table 6 and Table 7 are as following: EG; ethylene glycol, $AgNO_3$; silver nitrate, $Cu(NO_3)_2 \cdot 3H_2O$; cupric nitrate trihydrate, PVP; polyvinyl pyrrolidone, KOH; potassium hydroxide, $NaBH_4$; sodium borohydride, PW; pure water, $SnCl_4$; stannous chloride; T. A; tartaric acid, and $NH_3$; ammonia. Meanwhile, in the TEM-EDS analysis, tin, silver, and copper in the tin-silver-copper alloy particles were quantitatively analyzed in the way similar to Examples 1 to 15; and in the ICP analysis, too, tin, silver, and copper in dried powders of the tin-silver-copper alloy particles were quantitatively analyzed in the way similar to Examples 1 to 15.

Comparative Examples 4 was carried out in the way similar to Examples 16.

TABLE 6

| | First fluid | | | | | | | | | | | | |
|---|---|---|---|---|---|---|---|---|---|---|---|---|---|
| | Solvent | Mixed and dissolved substances | | | | | | | | | | Supply | |
| | | 1 | | 2 | | 3 | | 4 | | 5 | | 6 | temperature | pH |
| Example | Kind | Kind | (M) | Kind | (M) | Kind | (M) | Kind | (wt %) | Kind | (wt %) | Kind | (° C.) | (pH meter) |
| 16 | PW | $SnCl_4$ | 0.05 | $AgNO_3$ | 0.00171 | $Cu(NO_3)_2 \cdot 3H_2O$ | 0.000479 | T.A. | 2.08 | | 1.18 | $NH_3$ | 100 | 9.43 |
| Comparable Example 4 | PW | $SnCl_4$ | 0.05 | $AgNO_3$ | 0.00171 | $Cu(NO_3)_2 \cdot 3H_2O$ | 0.000479 | T.A. | 2.08 | | 1.18 | $NH_3$ | 100 | 9.43 |

TABLE 7

| | Second fluid | | | | | | | | | |
|---|---|---|---|---|---|---|---|---|---|---|
| | Solvent | Mixed and dissolved substances | | | | | | | Supply | |
| | 1 | 1 | | 2 | | 3 | | 4 | temperature | pH |
| Example | Kind | (wt %) | Kind | (wt %) | Kind | (wt %) | Kind | (wt %) | Kind | (° C.) | (pH meter) |
| 16 | PW | 10 | $NaBH_4$ | 3 | KOH | 0.85 | EG | 0.15 | PV | 25 | 13.52 |
| Comparable Example 4 | PW | 10 | $NaBH_4$ | 0.02 | KOH | — | — | — | — | 25 | 13.94 |

TABLE 8

| | Processing surface Rotation | Discharged solution | TEM-EDS | | | Measurement point where 100% of Sn, of Ag, or of Cu | ICP | | | Particle |
|---|---|---|---|---|---|---|---|---|---|---|
| | number | pH | Tin | Silver | Copper | | Tin | Silver | Copper | diameter |
| Example | (rpm) | pH meter | Mole ratio | | | was detected | Mole ratio | | | (nm) |
| 16 | 1700 | 9.74 | 95.84 | 3.54 | 0.62 | No | 96.6 | 2.9 | 0.5 | 30 to 40 |
| Comparable Example 4 | 1700 | 10.1 | 98.76 | 1.08 | 0.16 | Yes | 95.8 | 3.4 | 0.8 | 40 to 90 |

According to the TEM-EDS analyses of all the analysis points in Example 16, in the ratio of tin, silver, and copper (mole ratio) in the tin-silver-copper alloy particles of Example 16, there was not detected the analysis point at which tin was 100%, silver was 100%, or copper was 100%. It was found that in each of 10 tin-silver-copper alloy particles in Example 16 whose EDS analyses were conducted, in 50% or more points of the 5 analysis points, the mole ratios of tin, silver, and copper in the TEM-EDS analysis were detected within ±30% of the mole ratios of tin, silver, and copper obtained by the ICP analyses.

Meanwhile, in the STEM-EDS analyses, too, in 50% or more of the analysis points, the mole ratios of tin, silver, and copper were detected within ±30% of the mole ratios of tin, silver, and copper obtained by the ICP analyses. Further, in the XRD analysis, the peak attributable to tin was confirmed; but the peaks attributable to the single body of silver or of copper could not be confirmed.

As discussed above, although the tin-silver-copper alloys that have been reported in the past were eutectic alloys, it could be confirmed that the alloy of the Example 16 was the tin-silver-copper alloy particles substantially not containing the eutectic.

Figure 26:
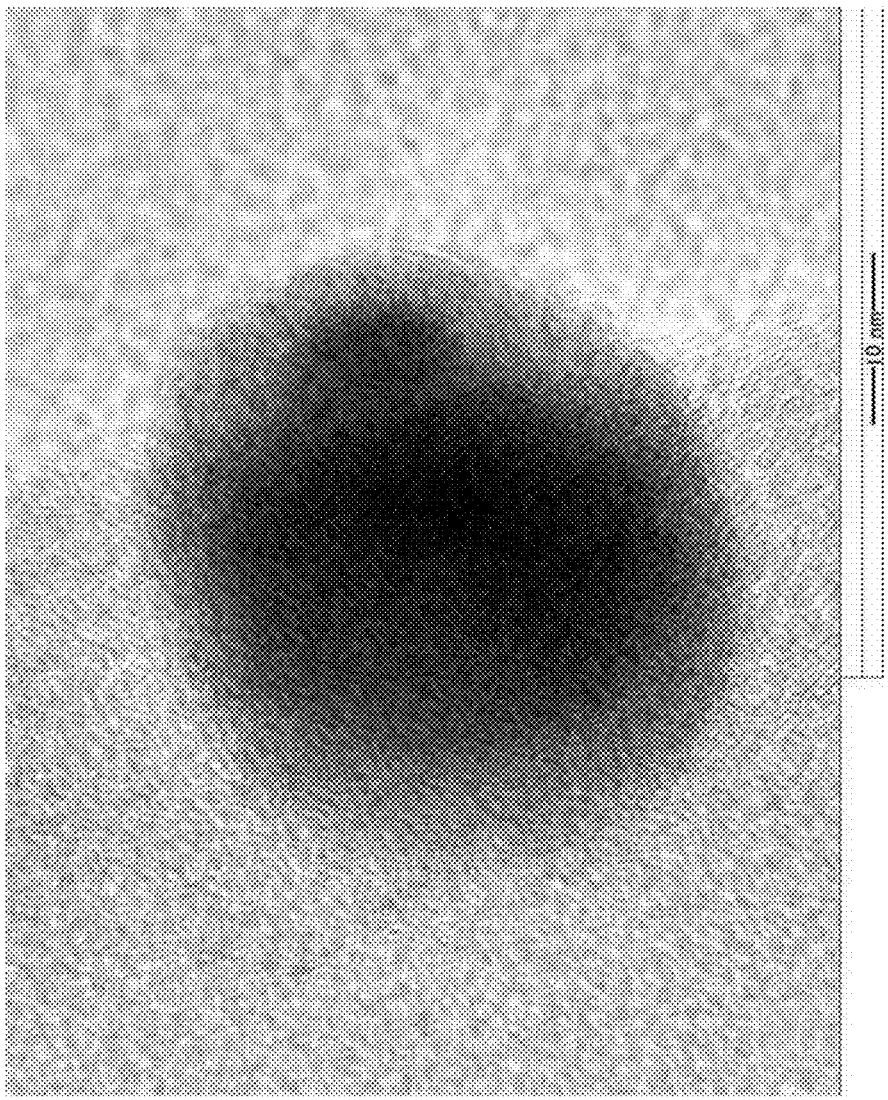
FIG. 26: This shows the TEM picture of the tin-silver-copper alloy particle prepared in Example 16.

As discussed above, in Example 16, it was found that the tin-silver-copper alloy particles not containing the eutectic body could be obtained when the fluid which contained a stannous ion, a silver ion, and a copper ion was mixed with the fluid which contained at least two reducing agents (sodium borohydride, and in this Example, PVP and ethylene glycol were used as the reducing agents) in the thin film fluid formed between at least two processing surfaces which were disposed so as to be able to approach to and separate from each other, at least one of which rotated relative to the other, preferably when pH of the fluid after the mixing was made 8 or higher. In addition, the composition ratio of Example 16 (tin:silver:copper=96.6:2.9:0.5 (mole ratio) and 97.0:2.7:0.3 (weight ratio), based on the ICP analysis result) is the composition of the metal alloy that can be used in a general solder. Melting point of a general solder is 217° C.; however, in the alloy obtained in Example 16, starting temperature of the endothermic peak was 195.68° C., showing depression of the melting point based on the result of the measurement by the DSC (by the differential scanning calorimeter DSC-60, manufactured by Shimadzu Corp.) with the temperature ascending rate of 10° C./minute (40 to 230° C.) under a nitrogen atmosphere with the sample amount of 5.4 mg. The TEM picture of the particle obtained in Example 16 is shown in FIG. 26.

1 first processing surface
2 second processing surface
10 first processing member
11 first holder
20 second processing member
21 second holder
d1 first introduction part
d2 second introduction part
d20 opening

The invention claimed is:

1. A method for producing a silver-copper alloy particle, that is a solid silver-copper alloy having 0.1 to 99.94% by weight of copper concentration contained in the silver-copper alloy, and said solid silver-copper alloy has a non-eutectic structure in an amount of 50% or more by volume wherein the non-eutectic structure does not contain a eutectic at room temperature, said method comprising the steps of:
providing at least two fluids of a first fluid and a second fluid to be processed between at least two processing surfaces which are able to approach to and separate from each other and be made movable relatively, the first fluid containing silver ions and copper ions, the second fluid containing a reducing agent;
keeping a distance between the processing surfaces in a space being less than 1 mm by a balance between a force in the approaching direction and a force in the separating direction, including supply pressure of the fluid to be processed and pressure exerted between at least two processing surfaces that rotates relatively;
allowing the space maintained between at least two processing surfaces to serve as a flow path of the fluid to be processed, whereby the fluid to be processed forms a thin film fluid; and
mixing the fluids to be processed in the thin film fluid thereby separating particles of the silver-copper alloy in the thin film fluid;
wherein the reducing agent is comprised of at least two kinds of reducing agents, and silver and copper are separated simultaneously by using the at least two kinds of reducing agents.

2. A silver-copper alloy made by the method of claim 1, wherein the silver-copper alloy is a solid silver-copper alloy having 0.1 to 99.94% by weight of copper concentration contained in the silver-copper alloy, and the said solid silver-copper alloy has a non-eutectic structure in an amount of 50% or more by volume wherein the non-eutectic structure does not contain a eutectic at room temperature.

3. The silver-copper alloy according to claim 1, wherein the silver-copper alloy is obtained by mixing a silver ion, a copper ion, and a reducing agent in a thin film fluid formed between at least two processing surfaces which are disposed in a position they are faced with each other so as to be able to approach to and separate from each other, at least one of which rotates relative to the other, whereby separating a silver-copper alloy particle.

4. The silver-copper alloy according to claim 3, wherein the reducing agent comprises at least two reducing agents, wherein the said at least two reducing agents are at least two reducing agents selected from hydrazines and amines.

5. The silver-copper alloy according to claim 4, wherein the at least two reducing agents are hydrazine monohydrate and dimethylamino ethanol.

6. The silver-copper alloy according to claim 1, wherein the silver-copper alloy is a solid solution.

7. The silver-copper alloy according to claim 1, wherein both silver and copper are detected in the silver-copper alloy at all of the analysis points as a result of analysis within a space defined by the beam diameter of 5 nm by using TEM-EDS analysis.

8. The silver-copper alloy according to claim 1, wherein both silver and copper are detected in the silver-copper alloy at all of the analysis points as a result of analysis within a space defined by the beam diameter of 0.2 nm by using STEM-EDS analysis.

9. The silver-copper alloy according to claim 1, wherein the silver-copper alloy is a silver-copper alloy particle having 0.1 to 99.94% by weight as the concentration of copper contained in the silver-copper alloy.

10. The silver-copper alloy according to claim 1, wherein the silver-copper alloy comprises particles whose particle diameters are 50 nm or less.

11. The silver-copper alloy according to claim 1, wherein the silver-copper alloy does not have crystal grain boundary.

12. The silver-copper alloy according to claim 1, wherein the silver-copper alloy is a silver-copper alloy particle not treated by heat under dry condition.

13. The silver-copper alloy according to claim 1, wherein the silver-copper alloy is produced by mixing a fluid which contains a silver ion and a copper ion with a fluid which contains a reducing agent to separate a silver-copper alloy particle.

14. The silver-copper alloy according to claim 1, wherein the silver-copper alloy contains tin in addition to silver and copper.

15. The silver-copper alloy according to claim 1, wherein said solid silver-copper alloy has a non-eutectic structure in an amount of 65% or more by volume wherein the non-eutectic structure does not contain a eutectic at room temperature.

16. The silver-copper alloy according to claim 1, wherein said solid silver-copper alloy has 0.1 to 84.3% by weight of copper concentration contained in the silver-copper alloy.

17. The method for producing a silver-copper alloy particle according to claim 1, wherein the at least two kinds of reducing agents are at least two kinds of reducing agents selected from hydrazines and amines, and a pH of the fluid after mixing is in the range of 8 to 13.

18. The method for producing a silver-copper alloy particle according to claim 1, wherein at least one of the first fluid and the second fluid contains a dispersant showing a reducing property, and the reducing agent and the dispersant showing a reducing property are used together.

19. A silver-copper alloy, wherein the silver-copper alloy is a solid silver-copper alloy having 0.1 to 99.94% by weight of copper concentration contained in the silver-copper alloy, and the said solid silver-copper alloy has a non-eutectic structure in an amount of 50% or more by volume wherein the non-eutectic structure does not contain a eutectic at room temperature, wherein, as a result of analysis of mole ratios therein of silver to copper in a space defined by the beam diameter of 5 nm using TEM-EDS analysis, in 50% or more of analysis points, the mole ratios of silver to copper in the said solid silver-copper alloy are detected within ±30% of the mole ratios of silver to copper obtained by ICP analysis results of the said solid silver-copper alloy.

20. The silver-copper alloy according to claim 19, wherein the silver-copper alloy is obtained by mixing a silver ion, a copper ion, and a reducing agent in a thin film fluid formed between at least two processing surfaces which are disposed in a position they are faced with each other so as to be able to approach to and separate from each other, at least one of which rotates relative to the other, whereby separating a silver-copper alloy particle.

21. The silver-copper alloy according to claim 19, wherein the silver-copper alloy is a solid solution.

22. The silver-copper alloy according to claim 19, wherein both silver and copper are detected in the silver-copper alloy at all of the analysis points as a result of analysis within a space defined by the beam diameter of 5 nm by using TEM-EDS analysis.

23. A silver-copper alloy, wherein the silver-copper alloy is a solid silver-copper alloy having 0.1 to 99.94% by weight of copper concentration contained in the silver-copper alloy, and the said solid silver-copper alloy has a non-eutectic structure in an amount of 50% or more by volume wherein the non-eutectic structure does not contain a eutectic at room temperature, wherein, as a result of analysis of mole ratios of silver to copper in a space defined by the beam diameter of 0.2 nm using STEM-EDS analysis, in 50% or more of analysis points, the mole ratios of silver to copper in the said solid silver-copper alloy are detected within ±30% of the mole ratios of silver to copper obtained by ICP analysis results of the said solid silver-copper alloy.

24. The silver-copper alloy according to claim 23, wherein the silver-copper alloy is obtained by mixing a silver ion, a copper ion, and a reducing agent in a thin film fluid formed between at least two processing surfaces which are disposed in a position they are faced with each other so as to be able to approach to and separate from each other, at least one of which rotates relative to the other, whereby separating a silver-copper alloy particle.

25. The silver-copper alloy according to claim 23, wherein the silver-copper alloy is a solid solution.

* * * * *